US006245440B1

(12) United States Patent
Kuhlmann-Wilsdorf et al.

(10) Patent No.: US 6,245,440 B1
(45) Date of Patent: Jun. 12, 2001

(54) CONTINUOUS METAL FIBER BRUSHES

(75) Inventors: Doris Kuhlmann-Wilsdorf, Charlottesville; David D. Makel, Nelliesford; George T. Gillies, Charlottesville, all of VA (US)

(73) Assignee: University of Virginia, Charlottesville, VA (US)

( * ) Notice: Subject to any disclaimer, the term of this patent is extended or adjusted under 35 U.S.C. 154(b) by 0 days.

(21) Appl. No.: 09/147,100
(22) PCT Filed: Apr. 4, 1997
(86) PCT No.: PCT/US97/05149
§ 371 Date: Feb. 5, 1999
§ 102(e) Date: Feb. 5, 1999
(87) PCT Pub. No.: WO97/37847
PCT Pub. Date: Oct. 16, 1997

(51) Int. Cl.[7] .......................... H01R 39/24; H01R 43/12; B32B 15/02; B32B 15/14

(52) U.S. Cl. .......................... 428/611; 310/251; 310/252; 29/826

(58) Field of Search .................................... 428/611, 605, 428/608, 614; 310/251, 252; 29/826, 874, 876, 881, 882

(56) References Cited

U.S. PATENT DOCUMENTS 1,396,948 11/1921 Cooley .
3,763,683 * 10/1973 Alderfer .................................. 72/77

(List continued on next page.)

FOREIGN PATENT DOCUMENTS 45 848 4/1889 (DE) .

(List continued on next page.)

OTHER PUBLICATIONS

D. Kuhlmann–Wilsdorf, IEEE Transactions on Components, Packaging, and Manufacturing Technology, Part A, vol. 19, No. 3, pp. 360–375, "Electrical Fiber Brushes—Theory and Observations" Sep., 1996.

D. Kuhlmann–Wilsdorf, 41st IEEE Holm Conference on Electrical Contacts, pp. 295–314, "Electrical Fiber Brushes—Theory and Observations", Oct. 2/4, 1995.

*Primary Examiner*—John J. Zimmerman
(74) *Attorney, Agent, or Firm*—Oblon, Spivak, McClelland, Maier & Neustadt, P.C.

(57) ABSTRACT

A conductive fiber brush including a brush stock composed of plural conductive fibers or strands of fibers at least some of which may have plural bends along the leg of the fibers or strands. The fibers may have a diameter less than 0.2 mm and are arranged in contacting engagement with each other with the touching points among the fibers or strands maintaining elastic tension between the fibers or strands and thereby maintaining voids between the fibers or strands to produce a packing fraction between 1 and 50% and in extreme cases up to 70% but generally between 10–20% depending on the various factors, including the materials used, the current densities to be conducted, and the sliding speeds under operation. The plural bends are implemented by producing fibers or strands having a regular or irregular spiral, wavy, saw-tooth, triangular, and/or rectangular pattern, or other undulating pattern. Optionally, the voids in brush stock may be partially filled with a strengthening, lubricating, abrasive, and/or polishing material, and may be wrapped in an outer sheath, slid into a casing, or provided with an other covering of all or part of the area of the brush stock, be infiltrated or sprayed at the surface with some material, have an increased packing fraction at the surface and/or have some or all of the touching points between the fibers or strands soldered, welded or otherwise thermally joined. Optionally also, the friction among the fibers may be reduced through light lubrication applied by rinsing the brush or brush stock in a lubricant. In one embodiment, the fiber brush is employed in a brush loading device having a hydrostatically controlled brush holder wherein the force exerted on the brush is controlled by a metallic or other conductive hydrostatic fluid which at the same time conducts the current to the brush.

69 Claims, 9 Drawing Sheets

U.S. PATENT DOCUMENTS

| | | | | |
|---|---|---|---|---|
| 3,771,189 | * | 11/1973 | Horton et al. | 15/179 |
| 3,892,376 | * | 7/1975 | Redmond et al. | 245/6 |
| 4,110,992 | * | 9/1978 | Jyo | 405/147 |
| 4,267,476 | | 5/1981 | Lee | 310/251 |
| 4,358,699 | | 11/1982 | Wilsdorf | 310/251 |
| 4,361,775 | * | 11/1982 | Diepers et al. | 310/248 |
| 4,415,635 | | 11/1983 | Wilsdorf et al. | 428/611 |
| 4,443,726 | * | 4/1984 | Ikegami et al. | 310/248 |
| 4,567,414 | | 1/1986 | Berings | 318/542 |
| 4,716,997 | * | 1/1988 | Gibson | 191/63 |
| 4,779,322 | * | 10/1988 | Dendooven | 29/419.1 |
| 4,788,104 | * | 11/1988 | Adriaensen et al. | 428/288 |
| 5,443,559 | * | 8/1995 | Chen et al. | 128/639 |
| 5,517,755 | * | 5/1996 | Wright | 29/843 |
| 5,599,615 | | 2/1997 | Swift et al. | 428/243 |
| 6,058,541 | * | 5/2000 | Masterman et al. | 15/28 |

FOREIGN PATENT DOCUMENTS

| | | | |
|---|---|---|---|
| 58 645 | | 9/1891 | (DE) . |
| 0280340 | * | 8/1988 | (EP) . |
| 0 298 377 | | 1/1989 | (EP) . |
| 488 220 | | 9/1918 | (FR) . |
| 1 245 247 | | 9/1960 | (FR) . |
| 2 058 479 | | 4/1981 | (GB) . |
| WO 81/03584 | | 12/1981 | (WO) . |

* cited by examiner

CONTINUOUS METAL FIBER BRUSHES

This invention was made in part by funds provided by the U.S. Department of the Navy. The U.S. Government may therefore have certain rights in the invention.

Description

1. Technical Field

This invention relates to fiber brushes, and in particular, the improvements in the design and manufacture of fiber brushes of the type disclosed in commonly owned U.S. Pat. Nos. 4,358,699 and 4,415,635, the disclosures of which are incorporated by reference herein.

2. Background Art

Although graphite and metal-graphite brushes have for nearly 100 years dominated the field of electrical brushes, for many applications there now exists a superior form of sliding electrical conduction; high performance fiber brushes wherein typically the fibers are made of metal for which reason they are called metal fiber brushes. Prime candidates for this new technology include sliding electrical systems which require high current densities, high sliding speeds, low electrical noise, high efficiency (low brush losses), compact size, or long brush lifetimes.

In particular, low voltage electric motors and generators can be made smaller, more powerful and longer lasting owing to the increased current capacity, higher efficiency and longer wear life. This has a direct bearing on electric vehicular and ship drive systems as well as low voltage electrical power generators. Other applications which require high currents, such as high-force linear actuators, electromagnetic brakes, and armatures, are similarly well suited.

Many signal-critical electronic devices such as rotating antennae, slip rings and shaft pickups for electronic sensors and other transducers could greatly benefit from the low noise and low voltage drop characteristics of metal fiber brushes. In addition, the new generation metal fiber brushes can be manufactured with dimensions as small as fractions of a millimeter with user-selected stiffness (as measured in applied brush force in Newtons per millimeter of resulting brush compression, for example), making them usable as closeproximity, multiple-pole sliding pickups. They are also superior for delicate rotating instruments, since the required brush forces are much lower than for typical graphite based brushes. The broad-band electrical "noise" emission spectra of electrical equipment such as drills, saws and other power tools can be greatly reduced by the use of metal fiber brushes, thereby reducing or eliminating the electrical interference through these brushes in use near sensitive electronic equipment.

As an interface, metal fiber structures and material can provide a low loss connection at greatly reduced forces, thereby providing high-efficiency, low force electrical contact. This is particularly important for high-current, low voltage switching, such as encountered in variable voltage battery storage systems which are charged at high voltages. Based on simple laws of physics, the capability of fiber brushes to efficiently transfer electrical current across interfaces which are in relative motion or at rest, is paralleled by their capability to similarly transfer heat. Therefore the brushes can also be used as heat transducers for cooling or heating purposes. The outstanding features of metal fiber brushes and some suggested applications are listed as follows.

High Current Capacity

Because metal fiber brushes can operate at very low losses, and consequently at low heat evolution rates, they can conduct higher current with lower losses than graphite based brushes. Continuous current densities of over 310 A/cm$^2$ (2000 A/in$^2$) have been demonstrated and this does not by any means represent an upper limit. Accordingly, equipment which operates at high currents and low voltages can be made more efficient and in many cases can run at higher power levels. Examples of this type of equipment include homopolar motors and generators, which have applications in electric automotive, rail and ship drives, low voltage generators, such as those used with fuel cells and with such applications as the hydrolyzation of water for combustible fuel production. Similarly, linear high current devices, such as linear actuators, and linear pulse generators.

Low Electrical Noise

As already mentioned above, metal fiber brushes can operate at much lower electrical noise levels than traditional graphite-based brushes. This can have dramatic benefits for signal-critical equipment on two fronts. First, instrumentation which requires rotating or linear sliding contacts, such as rotating antennae, can achieve much higher signal resolution than with graphite-based brushes. Second, machinery will give off much less electrical noise and therefore cause much less induced interference when located in close proximity to sensitive transducers, detectors, and other electronic equipment if metal fiber brushes are used.

Long Wear Life

Metal fiber brushes can achieve not only low dimensionless wear rates, measured in wear length of brush shortening per length of sliding path, but they can also be constructed with very long, and in some cases nearly unlimited, permissible wear lengths. This translates to extremely long brush life and greatly lengthened service intervals. For example, metal fiber brushes have demonstrated a dimensionless wear rate of $2\times10^{-11}$, and at this rate a brush will wear by 5 cm of wear length over $2.5\times10^{9}$ meters of sliding path, or over 1.5 million miles. Obviously, continuously operated equipment would greatly benefit from this feature of metal fiber brushes.

High Sliding Speeds

Many applications such as high speed motors and generators require electrical brushes which can operate at high sliding speeds. Metal fiber brushes have been successfully operated at speeds in excess of 70 m/s and their theoretical limit certainly lies considerably higher than that.

Compact Size

Electronic systems which need close proximity to a moving power or signal coupling, or spacecritical sliding contacts could be further miniaturized by the use of this new generation of metal fiber brushes because these brushes can be made in sizes down to fractions of millimeters in thickness or diameter. This has a particular application relating to signal power, and control-line pickups from rotating shafts such as are found in satellites, aircraft, periscopes, or many kinds of rotor testing systems.

Low Heat Dissipation

Because they operate at low loads and have very low resistance, metal fiber brushes dissipate much less heat than typical brushes in high-current or high-sliding-speed applications. This could be of great benefit in insulated or temperature sensitive equipment such as refrigeration systems or devices that incorporate compact rotating electronics.

Clean Operating

Unlike graphite-based brushes, metal fiber brushes do not generate fine carbon dust, which can cause problems not only with appearance and clean-up but also with long-term fouling and shorting. Metal fiber brush wear debris is heavy enough to be easily trapped or filtered making it therefore much easier to keep the system clean.

In addition, an advantage of metal fiber brushes is the smaller production of presumably more benign wear debris as compared to that of graphite-based brushes. At anticipated similar dimensionless wear rates of conventional and metal fiber brushes, reduction of wear debris volume from the latter is due to smaller running areas on account of increased current densities in combination with the fact that typically 80% to 90% of the brush is voidage, (1–f) with f the "packing fraction" of the volume occupied by fibers, which does not produce wear debris. The extreme limits of packing fraction range between 1% and 90%.

DESCRIPTION OF THE INVENTION a. General Considerations

The previous metal fiber brushes suffered from the following problems;

- difficulty of manufacture
- limitations on the achievable relationship between macroscopic brush stiffness and microscopic fiber compliance
- problems associated with the necessity of using a removable constituent during manufacturing
- limitations on the types of metals usable as conductors in the brushes on account of the need for differential etchability or dissolution of the matrix material.

The ideal, therefore, are fibers assembled into the form of rods (brush-stock), typically but not necessarily straight and of constant cross section, which locally leave the fibers within them individually flexible such that the properties at the interface to the conducting surface do not change if run end-on even for long periods of time so as to cause considerable wear.

b. General Characteristics of Brush Stock

The most important feature of fiber brushes is that at any one moment a large number of fibers, electrically connected to a current supply or sink, touch the interface (the rotor or substrate) which is electrically connected to the opposite pole. This requires that the fiber ends are at least somewhat independently mobile so as to be free to "track"the substrate contours. The efficient production of fiber brushes is therefore possible through the construction of "brush-stock" incorporating a multitude of electrically conducting fibers (preferably of 0.2 mm diameter or less) in a mechanically stable arrangement, which fibers extend along the brush stock for individual lengths not shorter than the brushes to be cut from the brush stock, and are substantially evenly spaced with a packing fraction f ranging as high as 70% or as low as 2% for special applications, but more typically varying between 10% and 20%. In the previous U.S. Pat. Nos. 4,358,699 and 4,415,635, otherwise comparable brush stock included a matrix material in which the fibers were embedded and which had to be etched away or dissolved in order to expose the fibers. The present invention substitutes empty space, i.e. "voidage", for such matrix material and the improvements which are necessary in order to accomplish this.

In principle, making such brush stock including voidage instead of a matrix material, requires the production of tows, felts, weavings, ropes, spooled layers or braids of fibers, in any combination, and to shape these into brush stock of a predetermined shape which without imposed forces includes a predetermined voidage and is mechanically strong enough to withstand the lengthwise brush pressures (typically up to a few newtons per square centimeter) without being crushed, and the bending forces on the brushes made from the brush stock which result from the friction between brush and rotor or other substrate. It also requires means by which to cut the brushes from the brush stock and producing working surfaces at which the fiber ends are individually flexible. Note, however, that high flexibility in regard to bending can be an advantage in case long pieces of brush stock are guided through suitable "guides" or apertures, if desired arranged so as to be pushed forward against the contacting surface through their own internal stress, much like a constant-force spring.

Such brush stock is characterized by the common feature that its cross section, or the cross section of its outer shell, is shaped to suit the intended application conditions of the brushes cut from it.

c. Fiber Materials

The basic requirement for the fibers is that they be electrically conductive. This means that they also are good heat conductors and that the brushes may be used for heat transfer across interfaces in the same manner as for current conduction. However, not all fibers within a given brush stock have to conduct current but some may have the purpose of increasing the mechanical stability of the brush ("support fibers"), and also for various other reasons fibers of different materials, cross sectional shapes and diameters may be used in the same brush.

In applications involving high current densities, the fibers are preferably made of the traditional metal conductors, specifically copper, silver, gold and their various alloys including brasses, bronzes and monels as commonly used in technology. On account of low cost and low intrinsic electrical resistivity, aluminum could in principle be useful, especially for physically large brushes, but it is prone to a high film resistivity and cannot be commercially obtained in fiber diameters thin enough for most purposes.

Under demanding conditions when cost is of little concern, besides gold, a variety of noble metal and metal alloys comprising silver, gold, rhodium, palladium and/or platinum in various proportions, a number of these which are available commercially, will be very useful. For protection from oxidation and corrosion of the base metals, platings of these noble metals are valuable. For use in conjunction with liquid metals, especially the sodium-potassium eutectic which is fluid at room temperature, niobium fibers are superior and would be difficult to replace. For commutating applications, prospects are good for cadmium or cadmium alloy fibers, and for use in rail transportation iron and its alloys, i.e. steels, importantly among them stainless steels are useful. Further, for some purposes, e.g. tarnish resistance, reduction of friction, provision of a protective layer for the substrate or rotor surface, wear rate reduction or facilitation of alloy shape fixing or eutectic bonding (see below) fibers are advantageously provided with suitable platings, e.g. of copper, silver, nickel, gold or other suitable metals or non-metals. Also, carbon/graphite may be used as fiber material and graphite or diamond plating can be invaluable for some applications. Finally, especially at high temperatures semiconductors could also be used, among them germanium and silicon.

d. Fiber Shapes, Internal Brush Friction

The cross sections of fibers will ordinarily be circular but they may be arbitrarily shaped, e.g. be elliptical, triangular, quadratic, polygonal, strip-like with or without curvature, and tube-like with one or multiple bores and have arbitrary external cross sections, as may be suitable for different purposes. In particular, strip-like fibers oriented with their long axis parallel to the sliding direction may facilitate reversals of sliding direction during operation, and bores may contain lubricants or be used for cooling purposes or delivery of cover gas. Also required are means to establish and maintain a desired fairly uniform distribution of the fibers at a predetermined packing fraction.

e. "Interior" Strengthening Through Eutectic Bonding and/or Alloy Shape Fixing

Often, especially at low packing fractions as may be desirable in order to conserve costs in case of noble metal fibers, one may want to make the brush stock stiff largely without regard for internal friction. In fact, the brush stock can be greatly strengthened by setting the touching points, or joints, in place through local soldering or welding. According to the present invention this is accomplished particularly effectively through "eutectic bonding". Stiffening of the brush stock without increasing internal friction is accomplished through "alloy shape fixing", wherein the momentary shape of the fibers is set into place through annealing at or above the recrystallization temperature.

f. Surface Treatments

The inventors realized that a rod-like, tube-like or strip-like fiber assembly as discussed would perhaps not necessarily need, but would mostly benefit from, some "surface treatment" to counteract the tendency for unraveling of the fibers about the circumference and at the rotor surface. "Surface treatments" include any and all treatments which will join the peripheral fibers more firmly together than interior fibers or to provide some kind of strengthening "skin". The effect of such surface treatments is to protect the macroscopic brush shape against splaying apart under the applied lengthwise force, preventing fibers at the surface to fluff out or unravel, and to increase the resistance of the brush stock against imposed forces, e.g. bending on account of friction against the tangentially moving rotor surface.

Surface treatments can take the form of an external casing of a material or geometrical construction different from that of the rest of the brush stock, into which the fibers are inserted or which is formed about the fibers. A surface layer can be applied through some treatment of the outermost layers of fibers, e.g. through spraying onto the brush stock a material which hardens. A sheath can be applied through wrapping the brush stock with a suitable foil or with metal leaf, with or without subsequent heat treatment to induce eutectic bonding and/or alloy shape fixing (see below) on the surface layers. Alternatively, surface treatments may be applied through rolling in a powder or slurry, through dipping in a liquid, or through electro-deposition or electroless deposition. Specifically, eutectic bonding can be used for surface stiffening via any application of Sn or In in conjunction with silver, copper, silver alloy and copper alloy fibers. It can be accomplished, for example, by wrapping the fiber bundles (in previous experiments of Cu or Ag or brass) with an outer sheath of copper or brass foil lined with an Sn or In foil. The sheath is then essentially soldered to the fibers on heating to the melting temperature of the Sn or In.

g. Partial or Complete Filling of Voidage

For the further improvement of fiber brushes the inventors had envisaged to mix graphite with the fibers to provide a lubricating and protective film for use in the open atmosphere. However, problems have been encountered with the intended admixture of graphite powder in the process of brush stock manufacture since it interferes with the eutectic bonding of silver and copper. However, graphite can be injected into the brushes as a slurry after completion.

h. Brush Loading

A further consideration in the use and operation of metal fiber brushes is the mechanical loading applied to the brushes during use. Metal fiber brushes can conduct very high current densities but require much lighter mechanical loading than conventional, "monolithic" brushes. Moreover, the brush force has to remain constant within reasonably close, predetermined limits, independent of the length of brush wear. This causes a problem because 1), the constant-force springs widely used for conventional brushes have a much too high electrical resistance for the purpose, especially if they are designed for low loads, and 2), conventional current leads capable of conducting the required high currents to and from the brushes, are stiff and interfere with the intended light mechanical loading. Furthermore, for practical mass applications, fiber brushes will eventually have to be sold/distributed in a packaged form which protects them from damage during storage, shipment and handling, and which is designed for fool-proof installation by private persons or unskilled workers, much like light bulbs or printer cartridges.

U.S. Pat. No. 4,415,635 envisaged metal fiber brushes composed of hair-like metal fibers protruding from a matrix material and conducting current to an electrically conducting surface (typically in relative motion to the brushes) against which the fiber ends were lightly, mechanically pressed. U.S. Pat. No. 4,358,699, greatly elaborated on different possible configurations of the concept of using hair-fine wires in electrical brushes, including the fibers contacting the conductor along their long surfaces, being felted or woven together, and strengthened in various manners, including by the incorporation of "support fibers", being fibers which are substantially more rigid and of a length a little shorter than the average fibers so as to protect these from accidental damage. The drawback of other than end-on contact between fibers and opposing conducting surface is too short a wear-life. Namely, wear by one fiber diameter shortens a fiber little if it occurs end-on but cuts off a whole length of fiber if it occurs on a lengthwise surface.

Disclosure of the Invention

Accordingly, one object of this invention is to solve the problems associated with the prior art metal fiber brushes.

A further object of this invention is to provide a new and improved electrical fiber brush stock from which electrical brushes can be cut having low electrical contact resistance, and associated therewith low interfacial heat generation and a low sliding wear rate.

A further object of this invention is to provide novel fiber brushes in which, at the interface to the conducting surface, the fibers are individually flexible.

Yet another object of this invention is to provide a new and improved method of manufacturing metal fiber brushes.

Yet another object of this invention is to provide a fiber brush that has a long wear life and does not change its characteristics through wear.

Another object of this invention is to provide a fiber brush which is compact in size.

Yet another object of the invention is to provide an electrical brush which emits little electrical noise.

Yet another object of the invention is to provide an electrical metal fiber brush which can be used with high current densities.

Still a further object of this invention is to provide a new and improved brush holder and loading device which maintains constant brush force while the brush wears.

These and other objects are achieved according to the present invention by providing a new and improved metal fiber brush including a brush stock having plural conductive elements and a cross section shaped in accordance with the intended use of the fiber brush. Some of the fibers may have plural bends along the length thereof. In addition, there is provided a new and improved method of making a conductive fiber brush including providing fibers, and bundling the fibers into a brush stock in which the fibers are in contacting engagement with each other maintaining voids between the fibers. This can be accomplished by means of a suitable die or form, within which the fiber arrangement concerned is constrained, or compressed, or into which it is permitted to expand, so as produce the desired cross-sectional form of the brush stock. The brush stock shaping may in commercial production be replaced or complemented by extrusion, continuous rolling or other reshaping methods, all while producing the final desired voidage.

According to yet another aspect of the present invention, there is provided a hydrostatically controlled brush holder mounting a conductive brush, and a conductive hydrostatic fluid coupled under pressure to the brush holder to control the force application to the brush as well as lead the current to it.

Still another aspect of the present invention, there is provided a brush holder which uses the elasticity of the brush stock to guide the brush stock forward against the contacting surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BEST MODE FOR CARRYING OUT THE INVENTION

General

The present invention provides metal fiber brushes which at the sliding interface operate in the same manner as previously patented metal fiber brushes but which, unlike those, are not painter's style but are cut from indefinite lengths of "brush stock" in the shape of rods or strips of arbitrary cross section, and which after shaping and/or surface or other treatment as described hereinafter have a running surface ready for use (in contrast to the prior art which required matrix material to be removed from among the fibers). The brush stock is composed of substantially parallel fine metal fibers (of diameter ≦0.2 mm, most typically about 50 μm within a range of 25 μm to 100 μm) whose lengths are at least several millimeters and more typically extend through a substantial part of the brush stock if not its whole length. The fibers are constructed so as to preserve, through potentially unlimited wear lengths, the characteristic metal fiber brush running surface, being composed of a multitude of individually flexible fiber ends. It is this structure of the running surface which, provided the film resistivity (i.e. the resistance of unit area of film, a critical quantity) is low, conveys the desirable metal fiber brush properties of (i) low electrical contact resistance, (ii) low electrical noise, (iii) ability to run at high speeds, (iv) ability to be used at high current densities, and (v) ability, indeed need, to run at light mechanical pressure and thus low mechanical loss; in all of these respects greatly outperforming conventional graphite-based brushes. While in most cases the fibers will be made of metal, in some cases they may be of carbon (graphite) or of semiconductors such as germanium and silicon, especially if operation at high temperatures is desired. For example, FIG. 1 shows a schematic side view of a brush (1) in a typical working mode. The brush (1) has an indefinite length, an interface at the rotor or other substrate (4), and an surface layer or casing (10).

Figure 1A:
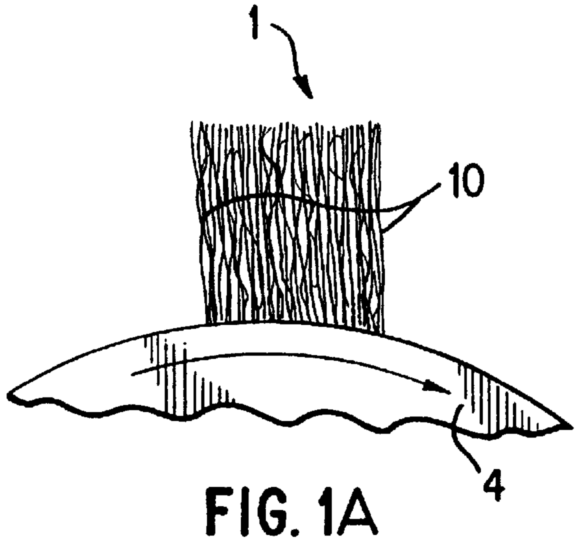
FIG. 1*a* is a schematic side view illustrating a use of the fiber brush according to the present invention.
Figure 1B:
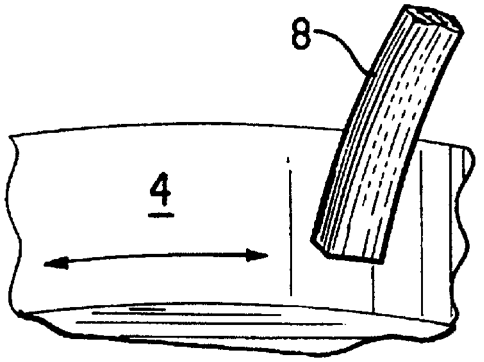
FIG. 1*b* illustrates a strip-like fiber inclined to the substrate surface in the plane normal to the sliding direction.

At the sliding interface, during use, the brushes contact the side to which electrical contact is being made (the "rotor" or "substrate") via a multiplicity of individually moveable fiber ends. Although FIG. 1*a* schematically shows the fiber brush with a normal orientation to the rotor surface, typically a brush is oriented at an arbitrary angle to the rotor surface (e.g., 15°–20° in trailing orientation and/or up to, say, 45° in the plane normal to the sliding direction) with the brush shaped to assure continuous contact with the rotor surface. As another example, FIG. 1*b* shows a strip-like fiber brush (8) in a working mode, wherein it is inclined to the substrate surface (4) in the plane normal to the sliding direction.

Figure 2:
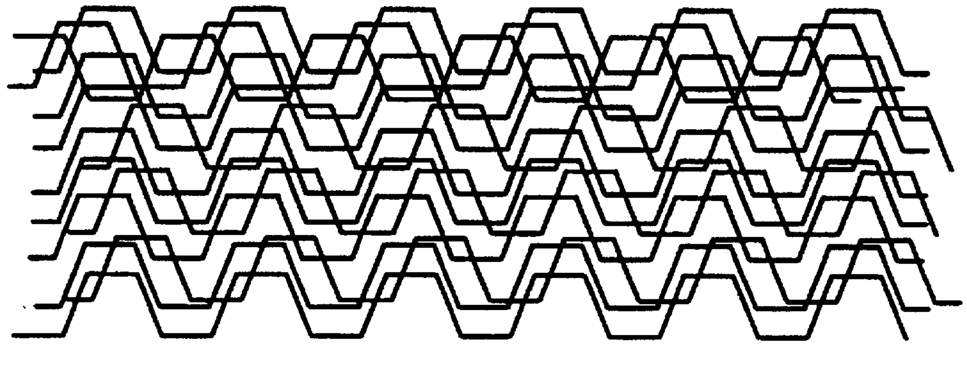
FIG. 2 is a schematic illustration of a kinked fiber mass of a brush of the present invention showing the multiple touching points caused by the kinking, waving, spiraling, etc. These touching points cause elastic stresses which tend to keep the fibers from bunching together during sliding, and also serve as possible bonding sites.

The requisite low wear rate of the brushes depends on running them with elastic contact spots under access of moisture (as is normally present in the free atmosphere and otherwise must be provided). If the simple fiber brush theory holds true, to this end the brush pressure must be below $p_{trans} \approx 3\times10^{-4}$ fH, where $p_{trans}$ is the critical force at the transition between elastic and plastic contact spots, f is the packing fraction, i.e., fraction of metal in the brush volume, and H is the Meyer hardness of the fiber material (see eq. 10b of "Electrical Fiber Brushes—Theory and Observations", D. Kuhlmann-Wilsdorf, ICEC-IEEE Holm 95, 41st Holm Conference on Electrical Contacts, IEEE, Montreal, Canada, Oct. 2–4, 1995, pp. 295–314; reprinted as "Electrical Fiber Brushes—Theory and Observations", D. Kuhlman-Wilsdorf, IEEE Trans. CPMT Part A, 19 (1996) pp. 360–375, which is incorporated by reference herein). Preferably the brush pressure is $p=\beta p_{trans}$ with $1/4<\beta<1/2$ which, under otherwise proper running conditions, will lead to dimensionless wear rates in the $10^{-11}$ range (see FIG. 2 in the cited paper). The brush pressure is adjusted so that the typical contact spot(s) between any single fiber and the rotor is/are only elastically, but not plastically deformed. That condition of elastic contact spots depends on a low load per individual fiber and is attained at $\beta<1$. Correspondingly, very fine fibers are desirable, and as discussed above are typically less than 0.2 mm thick. If the condition of elastic contact spots is met, both the electrical contact resistance and the sliding wear rate are low, as is essential for superior electrical brushes. (The described nature of the sliding interface is the same as for the previously patented brushes except that the role of adsorbed moisture was not yet known). In addition, for high current densities and high sliding speeds the optimum packing fraction range, at time of writing is between 12–15% for brushes made in the laboratory but, in agreement with the appended paper, it is anticipated that it will be near 20% in commercial production.

Preferred Fiber Materials

All conductive materials which can be formed into fibers are potential candidate materials for fiber brushes. Preferred choices include the traditional technological metal conductors, including copper, silver, gold and their alloys, including among the copper alloys, brasses, bronzes and monels, all of the named metal fiber choices with and without platings, among these in particular gold, silver and nickel. Also preferred materials are niobium, rhodium, platinum, and in general noble metal alloys such as are commercially available for operating electrical contacts in the open atmosphere, among them Paliney alloys. Further, carbon (graphite) and semiconductors including germanium and silicon are preferred materials. The choice depends on purpose, serviceability and cost; e.g. gold, platinum and rhodium are excellent fiber materials for almost all purposes but are very expensive and rhodium (and the harder noble metal alloys) tend to cut the rotor or other substrate surface. Among the noble metals, palladium is a preferred replacement for gold because it is lighter and much less expensive per troy ounce, with the further advantage that it plates well on other metals. As a major drawback, according to best previous laboratory experience, palladium tends to catalyze the formation of contact polymers which, if present, raise the film resistivity to an unacceptably high level. Niobium is almost irreplaceable for use in conjunction with liquid NaK. Nickel and nickel alloys are very corrosion resistant and have excellent mechanical elasticity. Further, nickel as an under-plate serves to prevent the diffusion of thin gold platings, in particular, but also a number of other platings, into the underlying copper. Semiconductors such as germanium and silicon are potentially valuable at high temperatures (in that case probably for highcost applications with hard rotor surfaces such as rhodium or platinum group alloys) but no experience with these does as yet exist, albeit iridium has been successfully tried on a very small scale. In addition, research is occurring on conductive plastic materials that may be used. The lower cost of plastic materials and their resistance against environmental attack are expected to be major advantages of using conductive plastic materials in fiber brush stock.

Control of Brush Stock Strength Through Touching Points

As in the previous brushes, the individual movability of the fiber ends, on which the desirable action of the brushes depends, is achieved through the inclusion of "voidage" such that the fibers occupy only a fraction (the "packing fraction") of the macroscopic brush volume. Previously, this was attained through letting the fibers protrude from a matrix material, typically by a length which was on the order of 100 times the fiber diameter. However, use of parallel fibers protruding from a rigid matrix material a la a painter's brush has the disadvantage that already relatively minor wear lengths (compared to the macroscopic length of the brush) substantially change its running characteristics and thereby cause relatively short brush life-times.

According to the present invention, empty space, i.e. "voidage", is substituted for matrix material and the proper packing fraction, "f", may be controlled by providing bends in the individual fibers along the length of the fibers, e.g., by crimping, kinking, waving, spiraling or curling the fibers in a regular or irregular pattern, so as to impart "loft". This facilitates the desired fairly uniform distribution of the fibers and the desired constant packing fractions which are maintained in spite of compressive forces in use. The effect is due to the establishment of touching points (or "joints") as shown, for example, in FIG. 2 where fibers touch mechanically, e.g. neighboring substantially parallel fibers, or mutually inclined fibers at crossing points. For otherwise same fiber morphology and arrangement, the average spacing of the touching points along each fiber is controlled by the manner of distorting the fibers; for example as is shown in FIGS. 4*a*–4*k*, the fibers can be modified through bending, kinking, curling, spiraling, waving, etc., alone or in any combination, with the bending or kinking imparting arbitrary shapes with arbitrary amplitude and wavelength.

The conductive elements have contacting engagements with each other at irregularly longitudinally spaced contact points with the contacting engagements maintaining elastic stresses between the conductive elements and maintaining irregularly longitudinally extending voids between the conducting elements.

Figure 4A:
FIGS. 4*a*–4*k* show examples of the different types of fiber bending as regular spiraling, irregular spiraling, regular waving, irregular waving, curling, regular saw-tooth, irregular saw-tooth, rectangular bending, regular V-crimping, irregular V-crimping, and waving with intervals, respectively.
Figure 4B:
Figure 4C:
Figure 4D:
Figure 4E:
Figure 4F:
Figure 4G:
Figure 4H:
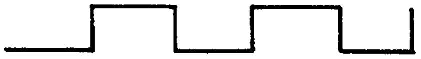
Figure 4I:
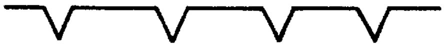
Figure 4J:
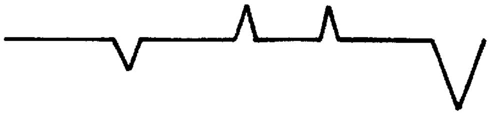
Figure 4K:
Figure 4L:
FIGS. 4*l* and 4*m* are illustrations of waved fiber strands, one containing three, the other four fibers.
Figure 4M:
Figure 4N:
FIG. 4*n* shows a twisted fiber strand which may be composed of two or more different metals each of which the brush stock may be composed partly or wholly.

A further tool in the construction of brush stock is the use of fiber strands in lieu of or in combination with individual fibers. Fiber strands are any bundled or twisted groupings of two or more fibers which are used together, e.g. taken off one spool. A major advantage of the use of strands is the increased speed of brush stock construction, resulting in cost savings. Another advantage of strands is that they can be employed as a further means to control the density and nature of the touching points in the brush stock. The fibers in any one strand are not necessarily all of the same size, morphology or material. FIG. 4*l* shows a bundled fiber strand composed of three individual similarly waved fibers and FIG. 4*m* shows a strand containing four fibers. A fiber strand made through twisting of either individual fibers or of fiber strands is shown in FIG. 4*n*.

Figure 4O:
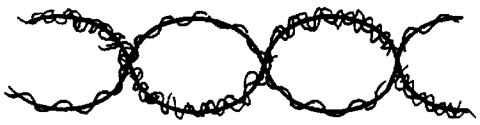
FIG. 4*o* shows two different twisted strands which are twisted together.

The effect of deviations from linearity of the fibers is to impart "loft" in much the same way as is the case for hair or textile fibers. This is due to an increase of "touching points" or "joints" among the fibers. The number of touching spots increases with the number of bends per unit length of fiber or strand as well as their amplitude, i.e. the magnitude of the deviations from linearity. The number of touching points or joints decreases with the number of fibers per strand. Geometrically a predetermined distribution of fiber joints may be obtained through twisting of two or more fibers together into twisted strands as is shown in FIG. 4*o*, which may be further processed like single fibers, e.g. be bundled, spooled, or layered, or if desired two or more bundled or twisted strands may be twisted together once again and the process repeated at will to effect roping. In this way a further control of the density and distribution of touching points, e.g. among fibers of different materials, diameters or shapes, is achieved. Or else predetermined touching spots can be achieved through bundling, or arranging into layers, fibers which have been curled, waved or kinked in any way.

Figure 5A:
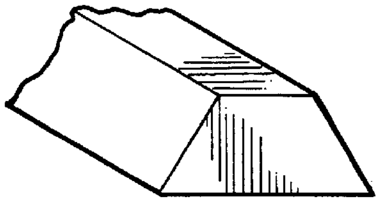
FIG. 5*a* is a three-dimensional view of a piece of brush stock whose cross sectional shape is of a truncated triangle.
Figure 5B:
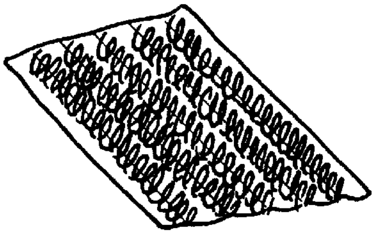
FIG. 5*b* is a semi-schematic cross sectional view of the possible arrangement of parallel spiral-shaped fiber strands of which the brush body in FIG. 5*a* could be composed.
Figure 5C:
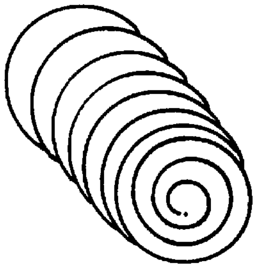
FIG. 5*c* shows nested concentric spiraled fibers of which the brush stock of FIG. 5*a* could be composed in the arrangement of FIG. 5*b*.

If desired, a roughly uniform distribution of touching points is achieved through regular self-contained elastic stresses. One example here is weaving and braiding of straight fibers. The same effect with a lower density of touching points is obtained in brush stock in the form of a set of nested, graded concentric spirals, for example as is shown in FIG. 5*c*, made of intrinsically straight fibers, with either the same or alternating sense of rotation from the center outward, or any arbitrary sequence of sense of rotation. Brush stock which is composed of spirals with only one sense of rotation will, on brush force application, tend to twist about the lengthwise axis. This effect is avoided when employing alternating handedness of spiraling as achieved through the method of FIG. 12*e*. Similarly, brush stock may be composed of cells of single or nested spirals as is shown in FIG. 5*b*, or in a related geometry the fibers may be loosely roped for obtaining a low density of contact spots. Crimping, kinking, waving, etc. of the fibers in any of these geometries increases the density of touching points correspondingly.

Control of Internal Brush Stock Friction

While the effect of the touching spots is to keep fibers apart through normal forces at them, thereby aiding in the even distribution of the fibers and mechanically stiffening the brush stock, at the same time through local friction the touching points impede lengthwise relative motion between the fibers and thereby interfere with the desired individual fiber-end mobility needed for tracking the substrate contour. Those undesirable internal friction forces which interfere with fiber-end mobility rise with the number of touching spots as well as the average force with which the fibers are pressed together. Both of these rise with packing fraction. Therefore in practice the upper limit of f is controlled by the degree to which proper brush operation depends on individual fiber end mobility, e.g. higher f's may be used at low speeds rather than at high speeds, for smooth rather than for rough substrates, for high brush pressures rather than for low brush pressures.

It may be noted that the advantage of any of the geometries involving spiraled or roped. fibers introduced above is that they exhibit reduced internal friction on account of relatively few touching points, in combination with high reversible compressibility in lengthwise direction. The latter is advantageous because it facilitates "tracking" of the fiber ends on the substrate. The brush stock stiffness against bending depends on specific construction and is evidently low for roping and much higher for the spiral cell structure.

Lack of stiffness against bending is not necessarily a disadvantage but requires that brushes be guided through apertures which fix their position relative to the contacting surface at a distance which decreases with increasing brush stock flexibility in bending.

Given a certain morphology of the fibers, e.g. kinked or waved in a particular manner to impart "loft", the packing fraction may still be varied independently, and with increasing f as well as "loft", the macroscopic stiffness of the brush increases. Simultaneously, the ability of the average fiber tip to remain in contact with the rotor surface diminishes on account of the increasing number of, and increasing forces at, the three-dimensional connections among the fibers, i.e. the touching points, either through rigid or frictional bonding, as "joints" which are distributed along the fibers so as to leave some average free fiber length between them which shrinks with increasing packing fraction.

In line with these considerations, it is often useful to reduce the coefficient of friction at the average touching points so as to reduce the friction among the fibers and thereby improve individual fiber end flexibility as well as the length-wise elastic compressibility of the brush stock. This can be done through rinsing with a lubricant. A diluted colloidal graphite solution has been found to be very suitable in this regard. Even minute amounts of such lubrication, amounting on average to small fractions of 1 $\mu$m layer thickness on the fibers, have been found to be very effective to reduce internal brush friction, and also to be capable of reducing the friction between the brush and substrate.

Shaping Brush Stock and Hardening Effect of Partial Filling of Voidage

Brush stiffness is increased by filling the void space ("voidage", i.e., the fraction (1−f) of the brush volume not occupied by fiber material) between the fibers wholly or partially with a suitable filler material. While this increases internal friction and for this reason is mostly undesirable, the filler material may be chosen to serve as a lubricant, abrasive, polishing agent or other surface conditioner of the rotor surface, to be further discussed below.

In any case, unless roped or spiraled, the brush stock is ordinarily shaped via some mold or die. As a result, brushes according to this invention can have all of the same desirable characteristics as the previous brushes but can be worn to indefinite lengths without change of properties.

Figure 5D:
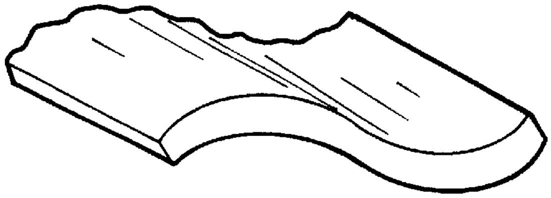
FIG. 5*d* shows a brush stock in the form of a wavy strip.

As already indicated, the mechanical firmness of frictional bonding increases with packing fraction as well as with the degree of curling/kinking and is thus controllable; e.g., for high packing fractions of very thin fibers (for high-performance brushes with very low contact resistance), less curling or kinking will be used than for low packing fractions (e.g., as for general purpose, low-cost brushes). Examples of the different shapes of a brush stock are shown in FIGS. 5*a* and 5*d*. FIG. 5*a* shows a brush stock with a triangular shape and FIG. 5*d* shows a brush stock in the form of a wavy strip.

Methods for Internal Strengthen of Brush Stock a—Eutectic Bonding

Brushes according to the previous invention, made from brush stock comprising fibers embedded in a matrix material, had the additional disadvantage that the fibers tended to splay apart, exactly as the bristles in a painter's brush, if pressed down too firmly. Similarly, when pressed against the rotor or other moving surface, also brushes obtained from continuous fiber brush stock will splay apart and in addition tend to bend. In order to prevent excessive bending and/or in order to contain the fibers at the interface more or less within the macroscopic geometrical brush stock profile, the brush stock is typically stiffened at least at its perimeter. In the present invention mechanical strength, most importantly against lateral extension or splaying of the brushes during installation or use, independent of or beyond that which may be achieved through control of touching points on account of friction among the fibers where they touch, or be due to a filler material, can be increased either through "interior bonding" (or "interior stiffening") or through "surface treatment".

"Interior stiffening", throughout the volume of the brush stock independent of void filling, may be effected through bonding of varying degrees of firmness at the touching points, or joints. Entirely rigid bonding may be obtained through what amounts to soldering or welding at the joints via "eutectic bonding". In this method a eutectic comprising the fiber, plating and/or stiffening material is allowed to form at about and above the melting temperature of the eutectic. If the molten eutectic wicks into re-entrant corners at fiber touching points, they are effectively soldered when the eutectic solidifies on cooling. The copper-silver eutectic, melting at about 800° C., is particularly suitable for this method. Eutectic bonding requires physical touching among the constituents of the eutectic, e.g. takes place among silver-plated copper fibers, among copper-plated silver fibers, or among mixed silver and copper fibers, or mixed fibers of any suitable alloys of these metals. A disadvantage here is that on account of the high melting temperature of the silver-copper eutectic, the requisite high annealing temperature tends to destroy the "spring" of the fibers which is needed for the elastic bending of the fiber tips in tracking the surface profile of the opposing surface. Albeit this may be counteracted by the simultaneous alloy formation which is the basis of alloy shape fixing, especially if the annealing is followed by a quench (see Alloy Shape Fixing below).

The low-melting (about 200° C.) eutectics of copper with tin or indium do not suffer from this disadvantage. However, they must be induced in relatively high concentrations locally, say through a tin or indium foil embedded between fibers. This is for the reason that low-melting eutectics tend to have a low surface tension (since thermodyamically the surface free energy is roughly proportional to the melting temperature). Therefore, if layered on the higher-melting copper or silver, indium and tin remain spread rather than wicking into re-entrant corners and thereby exposing the copper or silver surfaces of higher energy. As a result low-melting eutectics tend to only set joints which are wetted in the course of forming the eutectic, meaning when a significant excess of molten eutectic exists before cooling. Further, the experiments made by the inventors so far suggest that both Sn and In can leave a damaging, relatively high-resistance deposit on the brush track. This in turn tends to cause over-heating whereupon the Sn (or In) melts and fuses the fiber ends together so as to make the brush surface stiff and cause bouncing, effectively destroying the brush. It therefore seems, but has not yet been fully explored, that there exists a limiting concentration, depending on use of the brushes, above which tin and indium eutectics should not be used.

By the use of twisted strands comprising different metals, e.g. silver and copper in various proportions alone or together with bundled strands or single fibers of either or both of the pure metals, the distribution and concentration of rigid bonds can be controlled within the interior of the brush stock.

Instead of directly bonding fibers, one may also use metal powder mixed with the fibers, e.g., silver powder with copper fibers or vice versa, in which case the eutectic soldering takes place between the powder particles (which typically will dissolve or, at a high enough temperature, will melt in the process) and fibers which they touch. In lieu of powders one may similarly intersperse metal foil or metal leaf with the fibers. All of these methods may be used together in any combination, if desired involving different metals for the platings, powders and foils.

b—Alloy Shape Fixing

In case of very small concentrations of one of the two components used in the process which otherwise leads to eutectic bonding, e.g. silver leaf on copper fibers, the treatment causes the "setting" of the fiber geometry and an apparent stiffening of the fibers inspite of the high annealing temperature used, even though optical microscopic examination reveals no wicking of eutectic into re-entrant corners and the joints are in fact not bonded at all. The inventors have concluded that (1) this mechanical stiffening of the fibers and (2) setting them into place is due to two distinct effects which happen to occur simultaneously but can in principle be used independently. Firstly, the mechanical stiffening occurs through the diffusion of the low-concentration constituent (in this case the silver) into the fibers (in this case the copper fibers), thereby forming the corresponding harder alloy. Meanwhile, simultaneously recrystallization took place to set the now much stiffer alloyed fibers into the imposed "brush stock" configuration. Simple arithmetic suggests that in the present example only the first, say, $n<5$ layers of fibers could have been so alloyed, which at, say, $f=0.2$ packing fraction, and $d=50$ mm fiber diameters with a net film thickness of t=2 mm could have given rise to a silver concentration in the copper of $c_{CU}$=t/(fnd)≈4 vol %, i.e. enough alloying to confer considerably increased strength to the fibers. Actually, it is questionable whether the alloying was uniformly spread through the fibers, although with the speeding up of diffusion via concurrent recrystallization this could have been so.

The above leads to an improved method of forming fiber brush stock, via annealing plated fibers or fibers mixed with metal leaf or metal powders at their recrystallization or alloying temperature, whichever is higher, long enough to let some or all of the plating leaf or powder dissolve in the fibers. This simultaneous alloying and recrystallization is expected to increase the fiber strengthlelasticity while it sets into permanent place the shape that is concurrently imposed on the fibers via compressing in the brush stock form, or as rolled or twisted e.g. as in FIGS. 12*d* and *e*. Beyond this, the invention includes the possibility of simultaneously or subsequently using other metallurgical techniques, e.g. of establishing concentration gradients in the fibers, or quenching and age-hardening, to improve the mechanical or other properties of the fibers. Also, setting into place may be done through heating to the recrystallization temperature independent of any diffusion treatment and, conversely, diffusion treatments are possible below the recrystallization temperature and therefore without setting the momentary shape into place. It is conjectured that ordinary eutectic bonding, e.g. with copper fibers plated with a normal thickness of silver, did not lead to observed alloy strengthening because the liquid eutectic layer was so thick that it quickly contracted into re-entrant corners before significant diffusion of the lowconcentration constituent (e.g. silver) into the rest of the fibers could take place. Correspondingly, the optimal conditions for alloy shape fixing still require exploration.

Suitable plated wires for alloy shape stiffening are expected to include: (i) copper-plated silver, (ii) silver-plated copper, (iii) nickel-plated copper, (iv) gold-plated copper with an under-plate of nickel, to name those which are commercially available (i.e. (ii)) or can be readily made even in our own laboratory. For maximum hardening at minimum loss of electrical conductivity, a zirconium plate on copper or a chromium plate on copper would be desirable. As implied by the preceding explanations, it is anticipated that the plating thickness and annealing times can be adjusted to either yield an optimal alloy at full dissolution of the plating material in the fiber (e.g. for (i) copper into the silver so as to reduce oxide formation) or to leave a remnant plating as probably advantageous in the other three cases. The particular advantage of (iv) gold-plated copper with an under-plate of nickel, is to harden the copper by means of the nickel, and retain a gold-plate to lay down on the wear track a thin protective gold layer. Many other combinations are doubtlessly possible. Nor is the method restricted to two components, but three or more may be utilized, e.g. copper and silver may be diffused into gold alloy fibers, simultaneously or consecutively. Also non-metals can be employed, e.g. carbon can be diffused into iron or steel fibers.

c—Layering. Rolling-up or Pleating Fiber Layers or Fiber Felt

Figure 8A:
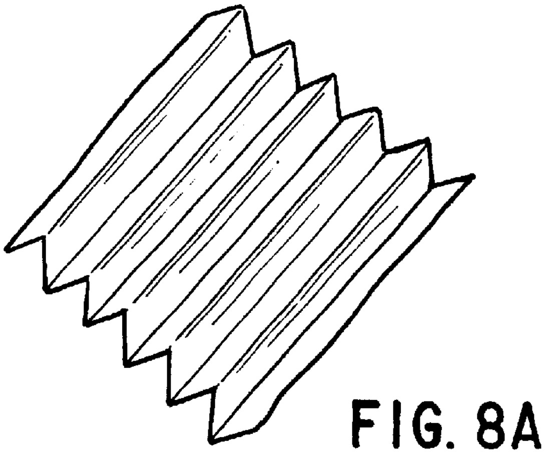
FIG. 8*a* illustrates accordion-pleated layer of fibers or fiber felt.
Figure 8B:
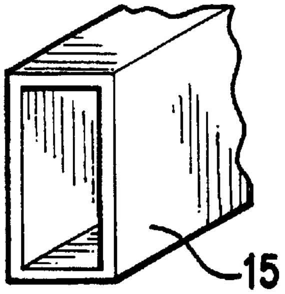
FIG. 8*b* shows a possible casing or sheath or other surface layer for the accordion-pleated brush stock in FIG. 8*a* as compacted into the form of FIG. 8*c*.
Figure 8C:
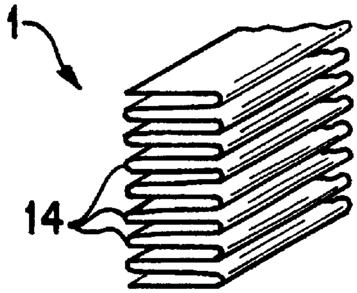
FIGS. 8*d* and 8*e* show alternative arrangements of pleats.
Figure 8D:
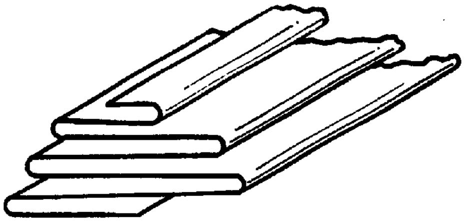
Figure 8E:
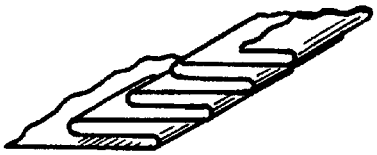
Figure 11A:
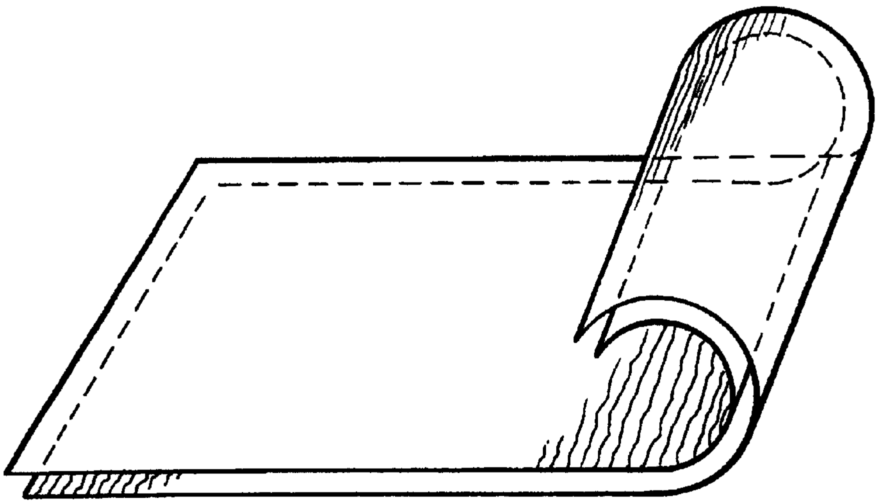
FIGS. 11*a* and 11*b* illustrate other forms of making a brush stock of one or more layers of fibers, strands, or felt.

A disadvantage of interior eutectic bonding is that it raises interior friction. Other methods in lieu of or in addition to alloying through diffusion described in the preceding section may therefore be used to mechanically strengthen the bulk of the brush stock with lesser impact on internal friction. One method consists of placing a layer of fibers or strands, not necessarily all parallel, on a flat surface and rolling it up, as is shown in FIG. 11*a*, or folding or pleating it to the desired shape of the brush stock. A fiber felt, consisting of a thin layer of mutually misoriented fibers bonded at a suitable concentration of touching points, can take the place of the layer of fibers. Similarly, one may layer fibers, felts and/or foils on top of each other and roll them up. Likewise, as is shown in FIG. 8*a*, one may pleat the fibers, felts, and/or foils (13) into desired morphologies, e.g. by accordion pleating (14) parallel to the long axis of the brush stock, wherein the individual fibers may be inclined at moderate predetermined angles, e.g. ±30° to that axis. FIGS. 8*c*, 8*d* and 8*e* show alternative arrangements of pleats to achieve different brush stock shapes.

Figure 11B:
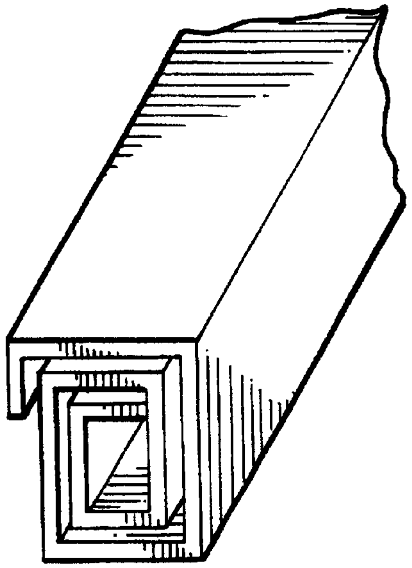

Any of these methods strengthen the brush against bending even while internal friction may be kept low, depending on construction. For example, in lieu of or in addition to, internal eutectic bonding or alloy shape fixing, one may spread straight or kinked, waved, etc., fibers and/or fiber strands out over a thin eutectically bonded skin, or over any suitable foil of, say, 0.1 mm thickness, and roll up the assembly (FIG. 11*a*) or fold it (FIG. 11*b*) appropriately into the desired brush stock shape. One may then either rely on the extra strengthening effect through the skin or foil, or one may with appropriate choice of fibers continue with a eutectic bonding or alloy shape fixing heat treatment. In addition, in FIG. 8*b*, a possible casing (15) or other surface treatment for accordion-pleated brush stock (1) with according pleats (14) may be made of foil or a layer of bias-oriented fibers or strands, perhaps eutectically bonded as with any combination of Ag, Cu, Cu-plated, an Ag-plated fibers. Alternatively, one may interleave for example copper fibers destined for the brush stock interior with silver leaf of only 1 μm thickness or less and use the alloy shape fixing treatment. The requisite heating is such that the soldering and welding might be performed by rf induction heating, furnace heating or any other suitable means.

Figure 9:
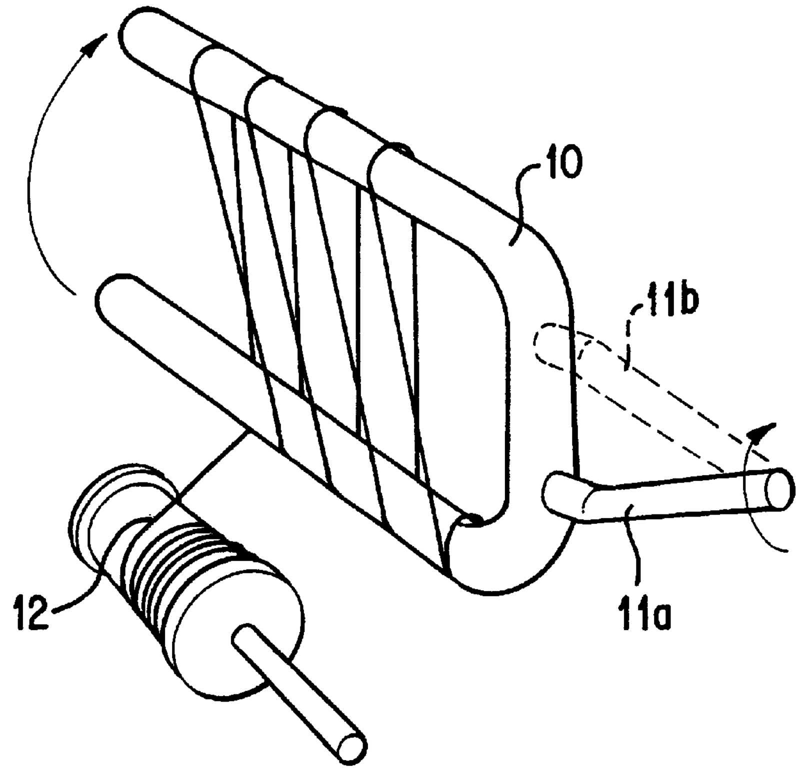
FIG. 9 illustrates production of fiber or strand layers by winding, for future rolling up or pleating.

Winding fibers or strands into layers for future rolling up or pleating is illustrated in FIG. 9. A spool of fibers or strands (12) is wound around a winding frame (10) of arbitrary shape. The frame (10) can have a rotation axis (11*a*) in an arbitrary orientation and be rotated to an alternative rotation axis (11*b*) for production of bias windings. A stiffener, e.g., a thin layer of eutectically bonded fibers may be inserted between the fibers on opposite sides of the frame (10).

Figure 12A:
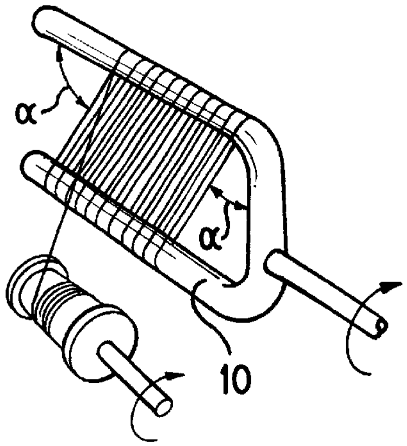
FIG. 12*a* illustrates production of fibers or strand layers by winding, similar to FIG. 9, for making nested concentric spiraled fibers.
Figure 12B:
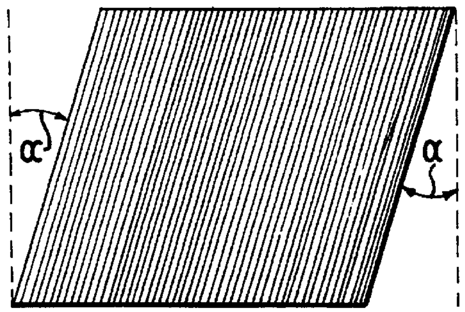
FIG. 12*b* illustrates the direction of the fibers or strands in FIG. 12*a*.
Figure 12C:
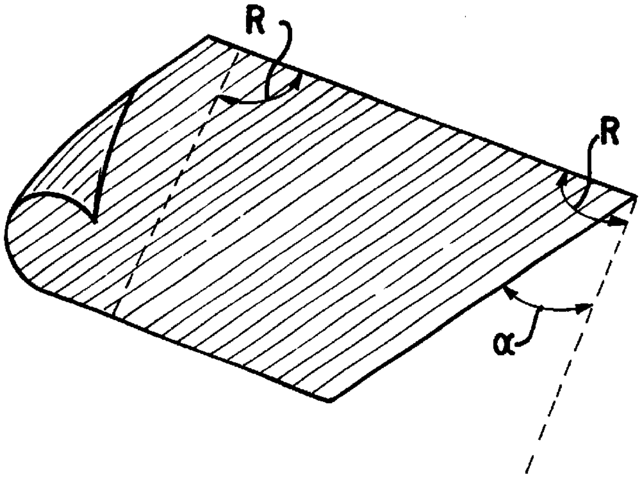
FIG. 12*c* illustrates rolling up a layer of fibers or strands into a cigarette-shaped brush stock to yield nested spirals all of the same handedness, e.g., left-handed.
Figure 12D:
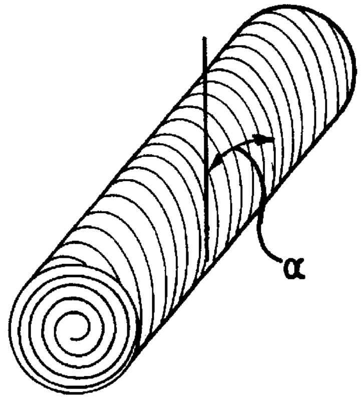
FIG. 12*d* illustrates an example of a cigarette-shaped brush stock resulting from rolling up a layer of fibers or strands as in FIG. 12*c*.
Figure 12E:
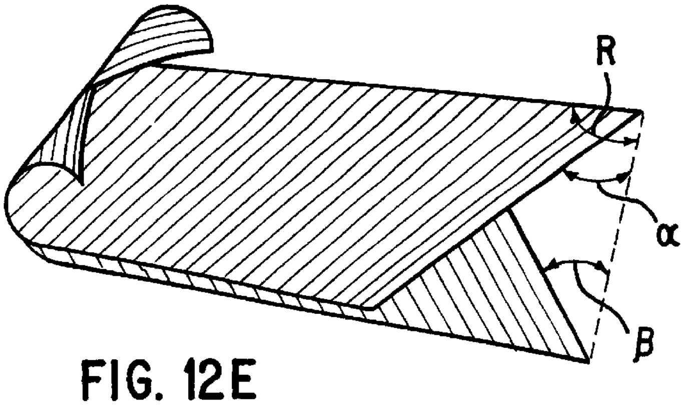
FIG. 12*e* illustrates the same method as in FIG. 12*c* but illustrates using two layers of opposite inclination (with arbitrary inclination angles labeled $\alpha$ and $\beta$) so as to yield nested concentric spirals of alternating handedness.

If desired, fibers or strands may be made into nested concentric spirals as is shown in FIGS. 12*a*–12*e*. To create nested concentric spiraled brush stock of one single handedness, e.g. left-handed, for example, one may begin with a layer of copper fibers or strands which is wound on a frame (10) as shown in FIG. 12*a*. The angle of the fibers (α) could be anywhere from 1 to 80 degrees or so, limited only by what can be mechanically produced, but is most suitable in the range between 5 and 40 degrees. Next, one may place a silver leaf (e.g. 0.5 μm thick) on the fibers or strands and roll the fibers or strands, (FIG. 12*c*), into a cigarette-shaped brush stock (FIG. 12*d* ), albeit, in commercial production the cigarette shaped brush stock could be indefinitely long. As shown in FIG. 12*d*, all of the fibers or strands will spiral around the "cigarette axis in the same sense", thus creating nested spiral concentric spiraled fibers all of same handedness, i.e. left-handed in FIG. 12*d*. This configuration of fibers combines a minimum number of contact points (joints), i.e., low internal friction and therefore good independent flexibility of fiber ends, with excellent elastic compressibility in a direction of a brush stock axis. In order to reduce or avoid the already discussed tendency of the brush stock to twist on brush force application, two or more layers with opposite fiber inclinations may be rolled up together, characterized by the bias angles $\alpha$ and $\beta$ as shown in FIG. 12*e*, to obtain concentric layers of spirals with alternating handedness. Note also that such nested spirals (cigarette-shaped) can be combined in parallel arrangements to form larger diameter brush stock of arbitrary cross section as is shown in FIG. 5*b*. After rolling the fibers or strands into the cigarette-shaped configuration, a surface treatment may be needed to keep the brush stock from unrolling and to keep individual brushes which are cut from such a brush stock from unrolling. However, by heating to the eutectic temperature of copper and silver, for example, or mildly below, the silver will dissolve in the copper fibers thereby hardening them, and then the fibers will recrystallize during annealing, thereby fixing the shape of concentric spirals. Or else, with any fiber material whatsoever, the shape may be fixed simply through holding at the recrystallization temperature until recrystallization is substantially or entirely complete. As a result, depending on the particular treatment chosen, a brush stock which is elastic, composed of hard fibers, and does not need a surface treatment can be achieved. Other materials may be used besides copper and silver leaf, as was used in the example of FIGS. 12*a–e*.

d) Selective Grading of Bonded Joints

Decreased distances between joints in the brush stock periphery will strengthen it relative to that in the interior, and as a result will increase stiffness against bending. Bonded joints can be given predetermined values by the use of twisted strands from tight twisting of multiple strands of the kind in FIG. 4*n* together, up to using only uncrimped fibers in the center with only as much twisting, roping or spiraling as may be needed to prevent the interior fibers from bunching together. Joint spacings along the length of any one fiber or twisted strands can thereby be graded from one or a few fiber diameters to one inch or more.

e) Use of Support Fibers

Figure 6:
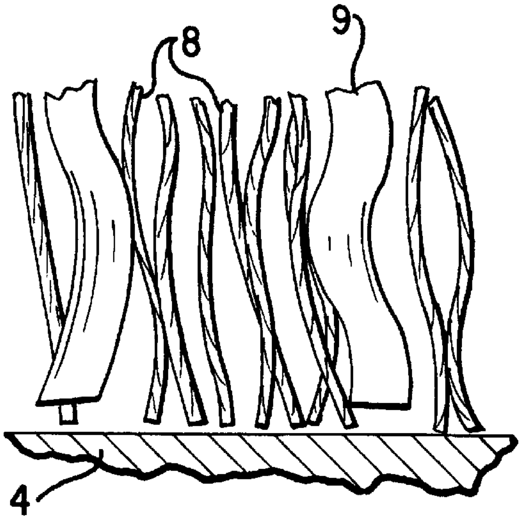
FIG. 6 illustrates "support fibers" as first introduced in U.S. Pat. No. 4,358,699.

Mixing of "support fibers", meaning fibers of substantially greater stiffness than the majority of the fibers into the brush stock, uniformly or with any desired gradation or distribution, will correspondingly mechanically strengthen the brush stock. For example, FIG. 6 shows support fibers (9) and ordinary fibers (8) in an unloaded state. Support fibers may be of the same material as the regular brush fibers but thicker, or they may be of any suitable material including non-metals such as graphite, or may even be nonconducting; they may be straight, crimped, spiraled, waved, etc., all as may be deemed to be most suitable for imparting macroscopic strength to the brush stock with optionally the smallest possible interference with individual fiber mobility or largest macroscopic brush stock elasticity in the direction of the brush stock axis. When a brush force is applied, the support fibers should touch the rotor or substrate surface only lightly.

Other strengthening through geometrical arrangement of the fibers can take the form of grading the packing fraction from a high level (perhaps as much as 70%) about the periphery to a much lower value in the interior, such as, for example, a packing fraction 15% greater on the surface than in the interior. Alternatively, one may produce a systematic variation of two different fiber types (i.e. a slow increase in amount of one relative to the other of different material, waviness and/or thickness) from the periphery to the center of the brush stock, e.g., so as to increase the density of bonding points progressing from the brush stock axis outward.

Surface Treatments

Surface treatments are used for any of the following purposes: To prevent the unraveling of fiber arrangement at the working surface and about the brush stock surfaces; to fix the geometrical shape of the brush stock; to mechanically strengthen the brush stock against bending; to insulate the brush stock and the brushes cut therefrom,—from the surroundings, including from electrical contact, physical or chemical contamination, or magnetic fields.

Figure 10:
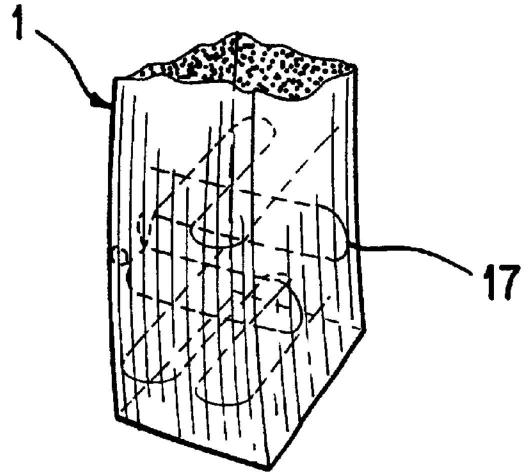
FIG. 10 illustrates a method of stitching used to stiffen the brush stock.

In addition to the already mentioned surface strengthening methods through gradation of fiber geometry and/or strengthening of joints, the following are methods to stiffen the brush stock by means of surface treatments which may be applied to part or all of the brush stock surfaces:

a) the use of a sheath or casing surrounding the bulk of the fibers, as is shown in FIG. 3*b*, FIG. 3*c*, FIG. 3*d* and FIG. 8*b*.

b) wrapping the outer surface c) Spraying, dipping, electroplating, electrophoresis, plasma spraying and irradiation d) stitching, as is shown in FIG. 10.

a) Casings

Figure 3A:
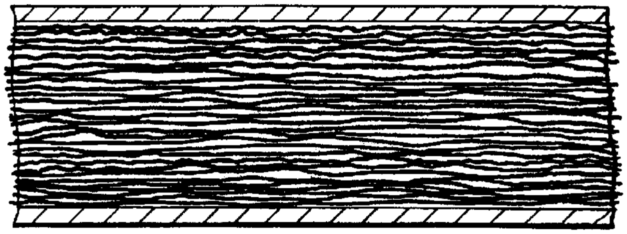
FIGS. 3*a* and 3*b* are side and end views, respectively, of one possible embodiment of an electrical fiber brush made using kinked fibers.
Figure 3B:
Figure 3C:
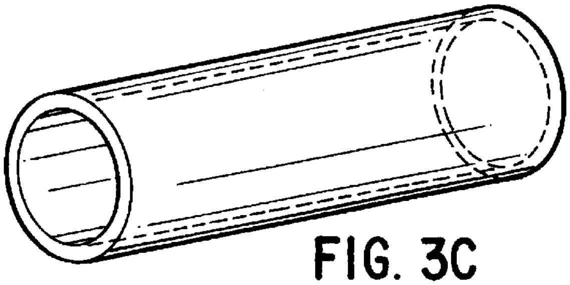
FIG. 3*c* is a perspective view of the casing surrounding the fibers in FIG. 3*b*.
Figure 3D:
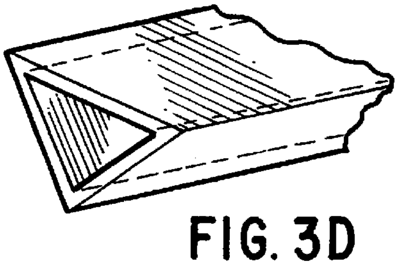
FIG. 3*d* is a perspective view of triangular casing. Typically, but not necessarily, a casing consists of a bonded kinked metal fibers.
Figure 3E:
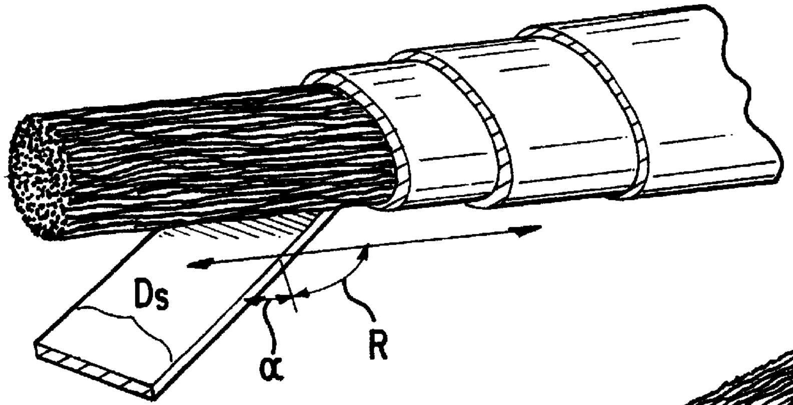
FIG. 3*e* shows a sheath in the process of being applied through wrapping a foil strip of Width Ds about the cylindrical brush stock at an inclination of angle y against the brush stock axis. Instead of a foil, the sheath can consist of a wrapping of fibers or, conversely, a wide foil, or any combination of these.
Figure 3F:
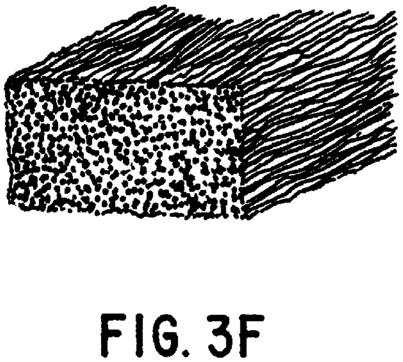
FIG. 3*f* shows the cross section of a rectangular brush stock including a surface layer which might have been made through dipping the brush stock into a suitable medium or spraying it. Alternatively, the surface layer could have been formed by arranging the fibers near the brush stock surface to be more densely spaced than for the average of the brush stock or to be more strongly kinked, or the joints to be bonded by any means including irradiation, electrophoresis, or electroplating. The non-sliding end of the brush can be soldered to a mounting plate or stub, plated solid, or crimped to create the finished assembly.

Strengthening through surface treatment may be achieved, through filling an independent casing with bundled, twisted, spiraled, kinked, braided, woven, roped or felted, or a combination of any of these, fibers or strands according to the pertinent points above. A casing of any predetermined shape and size may be made of fibers which are eutectically bonded or be made through alloy shape fixing or recrystallization fixing. For example, FIG. 3*d* depicts a triangular shape casing and FIG. 8*b* a rectangular shape casing.

b) Wrapping

Successful forms of mechanical strengthening via surface treatments include wrapping the fibers, with foils, strips, felt or fibers in any combination and fastening the wrapping in any number of ways. Fastening can be done, for example, by an additional wrapping of a thin foil of tin or indium and briefly heating, including up to the melting point of the lowest-melting component.

The dimensions and kind of wrapping material may be freely chosen, constrained only by the requirements that the rotor surface not suffer unacceptable damage through the wrapping or be covered by a residue which interferes with the brush operation in an unacceptable manner, e.g. through increasing the film resistivity or the coefficient of friction. Conversely, the wrapping may be used to aid in a brush operation, e.g. through containing some lubricant or mild abrasive. In the cases of strips and fibers, the individual turns may be inclined relative to the brush stock longitudinal axis at any chosen angle, from 90° to as shallow an angle as may still permit the wrapping to stay in place, which depends on the degree of fiber crimping or spiraling at the surface but will rarely be less than 20°. Favorably, such wrapping may be done in two or more thin layers of fibers or matted fibers, alternatively biased in orientation, e.g., ±45° inclined against the brush stock longitudinal axis, or it may be done with thin metal foil or metal leaf. In either case, alloy shape fixing, soldering or eutectic bonding may be used to obtain additional strengthening, or in the case of wrapping with a metal leaf followed by annealing the only significant strengthening that is obtained.

The inventors have successfully used indium or tin foil in combination with copper, silver and brass fibers, besides silver leaf and the already indicated choices of copper or silver foil. They do not doubt that besides brass other copper alloys including bronzes and monels will be suitable.

c) Spraying, Dipping, Electroplating, Electrophoresis and Irradiation

Other surface treatments, some of which have been used with varying degrees of success, include spraying the brush stock, e.g. with a slurry of metal powder or flakes or graphite or any suitable semi-conductor, or mild abrasive or other surface conditioner. These slurries may be thickened, or caused to set in place either on natural aging or subsequent mild heat treatment, by an admixture of agar-agar, waterglass, or cornstarch, or such liquids which have the effect of gluing fibers in place. Any of the latter may be used with or without the addition of graphite or other powders or flakes. The application of these surface treatments may be similarly achieved by dipping the brush stock into any of the above liquids. Should it be desired to treat only part of the brush stock surace, the remainder can be temporarily masked. Alternatively, more viscous constituents than may be applied through spraying or dipping may be applied through rolling the brush stock in them, e.g. as would apply to various powders, or slurries of the same kinds as already enumerated above. Enriching the brush stock surface by a powder or dough, e.g. by rolling or patting, could perhaps be assisted by application of a pressure difference between the inside and outside of the intended brush to speed up the process or in order not to damage the fiber arrangement.

Very importantly, too, surface treatment may be applied by thermal spraying including plasma spraying, flame deposition or other. Also used may be electroplating or electrophoresis, by which joints can be set into place and voidage be reduced at the surface at about room temperature and therefore without annealing the fibers. For example, electro copper plating of copper fiber brush stock would selectively strengthen the surface with little other effect. One of the goals of surface treatments, namely protection from contaminants, and as part thereof from chemical attack, could be effected through gold plating. Electrophoresis can have especially good applicability on account of the wide range of substances which can thereby be deposited on brush stock surfaces.

Joints can also be welded together, and new joints be created, through local melting at the surface. One method for this is use of a high-frequency furnace, another important one is irradiation through lasers.

e) Stitching

Stitching in the manner used for textiles or making shoes, for example, may be used for internal bonding or as one form of "surface treatment". Stitching may be employed in lieu of, or complementing other forms of, internal bonding or surface treatment and be applied before or after other surface treatments or eutectic bonding or alloy shape fixing, if any. For example, FIG. 10 shows a method of stitching used to stiffen the brush stock or individual brush (1). The threads (17) in such stitching are typically single metal fibers or strands of metal fibers and by the proper choice of thread material relative to the fiber material may be set through eutectic bonding or alloy shape fixing. Stitching can be in any orientation, be distributed over the whole brush or concentrated where needed, e.g. near the running surface. The thread can be single fibers or stands, whether twisted or not.

Ordinarily, all of the above treatments are used, or are contemplated to be used, on brush stock or brushes not covered by a casing, but optionally they can also be used on a casing before or after insertion of the fibers.

It may be noted that surface treatments by any of the above means, on part or all of an outer layer and/or a component in the outer layer, may be used temporarily, to be removed before completing the brush construction or just before brush use. Such removal may be done mechanically, through dissolution, etching or other means. It is further noted that the "surface treatment" may be used on any part(s) which are assembled into the final brush. For example, in a set of brushes constructed by the inventors, parallel layers of fiber material were interspersed with thin foils.

Rotor Surface Conditioning Through Void Fillers

In one embodiment of the present invention, all or part of the void space is filled with a suitable material, mostly injected in the form of a slurry of any of the kinds already enumerated in relation to dipping, spraying and rolling for surface treatments, which then solidifies in place. The result is a considerable strengthening of the brush stock which may be desired in case of rather low packing fractions. Graphite fillings of this kind have been successfully used to protect the rotor surface against oxidation (especially so far of copper fibers sliding on a silver surface and of silver fibers sliding on copper surface) when operating in the open atmosphere. Other useful fillers are possible. Besides graphite, candidate materials include $MoS_2$ and related sulfides (i.e. molybdenites) which, like graphite, provide lubrication and are electrically conductive but should best be used in dry conditions since $MoS_2$ is attacked by moisture.

Optionally polishing agents or mild abrasives for cleaning the rotor or other surface on which the brush slides may be added to those partial void fillers, or they may be used alone in the same manner, albeit in only small concentrations in order not to damage the surface and not to leave an insulating deposit. Choices of such admixtures, in any combination, include aluminum oxide, silicon carbide, colloidal silica and diamond powder, either alone or mixed with the already discussed fillers.

A drawback of void fillers is that they strongly reduce the fiber-end mobility on which good fiber brush operation depends, with this increase of interior friction rising steeply with increasing fraction of voidage filled. Interior lubrication, by contrast, can be achieved through rinsing with a lubricant. This could be a thin oil in case the accompanying reduction of contact resistance can be tolerated, or can be a dilute solution of colloidal graphite which is effective without noticeable increase of brush resistance. Other suitable lubricants may well exist and are being actively looked for.

Mechanical Means of Bonding or Strengthening Fiber Joints

In addition to the various means already mentioned, bonding at touching points may be achieved through compacting, say in a rolling mill or "turks head" and subsequent annealing. Since compacting is incompatible with voidage, it requires use of a temporary matrix material which is eventually removed. The introduction of a temporary matrix material is a time consuming complication and is applicable to only a restricted range of matrix/fiber materials combinations.

Under clean conditions rigid fiber joints may be made through diffusion bonding without compacting.

The Role of Humidity

The presence of absorbed water layers on the contact surface is highly desirable to prevent sticking and prolong wear. With brush materials which do not oxidize in the open atmosphere, normal atmospheric humidity is sufficient at low and medium current densities. Otherwise, moisture has to be provided. The provision of adequate moisture for metal fiber brushes, as needed, is therefore another aspect of the present invention.

The ambient humidity needed rises with the percentage of the rotor or substrate surface which is covered by brushes and also with the local heating, i.e. the current density. Normally, on continuous slip rings or rotors gaps have to be left between the brushes to permit moisture access. In extreme cases, moisture and/or cooling may have to be fed through the brushes themselves, either through the brush voidage or, given suitable fibers, through channels in some or all of the fibers. "Support fibers" will be particularly suitable for this purpose.

Miniature Brushes

For most applications, fiber brushes will be mid-sized, e.g. with characteristic dimensions between 0.5 cm to 3 cm. Miniature brushes made of brush stock in the form of flat shaped strip are a further aspect of the present invention. Any of the already discussed considerations apply except for the small dimensions, easily down to ¼ mm.

Large-Sized Applications of the Fiber Brush Technology

On the other end of the scale, large-sized metal fiber brush stock can be used for robust, long wearing, highly efficient cabling and sliding electrical connections which can be customized for particular applications and easily constructed with simple equipment. Specifically, flexible cables suitable for carrying currents up to hundreds of amperes (e.g. as may be needed for the rapid charging of future electrical cars or for current contacts for electric trains) could be made of brush stock, insulated from the outside, optimally composed of 50 $\mu$m or thinner metal fibers, with packing fractions in the order of f=10% or less, and a minimum of touching points and lubrication for reduced internal friction.

Alternatively or in combination with bundled fibers, thin layers of fiber felt, composed of long fibers oriented preferentially parallel to the direction of intended current flow, can be used. Similarly, an articulated bus (i.e. a movable jointed current conductor) for providing high currents to different locations could use this technology. The encased fiber masses, of average hair-fine diameters and therefore quite flexible, avoid the need for high forces. In addition or alternatively, the joints can be appropriately fully or partially covered with a metal fiber velvet or metal fiber felt to provide for low contact resistance across the relatively moving parts of any one joint, even while keeping the friction forces low to make the joints easily rotatable. With proper construction, the fiber felt or velvet could be made easily replaceable when necessary. In general, fiber felts consist of a thin layer of mutually misoriented fiber material, bonded at a suitable concentration of touching points, optionally without a preferential fiber direction to make the felt equally electrically conductive in any orientation within the felt. A fiber velvet has much the same construction, and should be made in much the same manner, as textile velvet, except that provision may be made for bonding some or many of the fiber joints for improved electrical conductivity.

Electrical brushes for both rotating and linear actuating applications could be constructed out of bundled fibers, fiber felts and/or fiber velvet, thereby providing high current capabilities, low loss and low noise. Fiber felts or velvets can be retrofitted into existing machinery when desired. High power, low voltage, high-current motors are particularly good candidates for this technology, as are signal-critical devices such as rotating antennae slip rings, microphones, video cameras, and other electronic and electrical devices.

Also, electrical contactors could greatly benefit from a layer of this felt on one of the contacting surfaces, especially when connected in the non-energized condition. An example of this would be battery contactors which could charge a battery bank from a low voltage, high current operating configuration by connection to a high voltage configuration for charging.

Expected Uses of Fiber Brushes

Fiber brushes are based on the theory disclosed in U.S. Pat. Nos. 4,358,699 and 4,415,635 and further developed in the paper "Electrical Fiber Brushes—Theory and Observations", by D. Kulmann-Wilsdorf, ICEC-IEEE Hohm 95 (41st. Holm Conference on Electrical Contacts, IEEE, Montreal, Canada, Oct. 2–4, 1995), pp.295–314, reprinted as "Electrical Fiber Brushes—Theory and Observations", D. Kuhlmann-Wilsdorf, EEE Trans. CPMT Part A, 19 (1996) pp. 360–375, which is incorporated by reference herein. This is the general theory controlling current as well as heat transfer across interfaces, at rest or in relative motion, and the disclosed construction optimizes the conditions at the interface on a microscopical scale. The applicability of fiber brushes is therefore unrestricted in regard to size above the dimensions of single contact spots, as to sliding speed subject to the limitations only of aerodynamic and hydrodynamic lift, in regard to temperature restricted only by the requirement that the fibers remain solid, and in regard to current and heat density only to that at which the interface locally melts. The fiber brushes are therefore applicable to all conceivable situations of current or heat conduction across interfaces, including rotating and reciprocating motions, as well as indefinite sliding on one (e.g. rails) or two-dimensionally extended substrates. The fiber brushes therefore, also, will in the future make possible technological or scientific developments which are still unanticipated or at the moment are stymied for lack of adequate means of current and/or heat conduction.

Specifically in terms of applications which are known at present, fiber brushes have for example utility in electrical power equipment, in electronic equipment especially in light of the superior signal characteristics as well as the capabilities presented for multiple close proximity sliding contacts, in electric automotive applications, in power generation and distribution systems, and in electrical linear actuators.

Methods to Control Fiber Kinking

An important aspect of the present continuous metal fiber brush construction is the use of kinked fibers. FIGS. 3*a* and 3*b* are examples of fiber brush made using kinked fibers. The desired elastic resistance of the fiber bundles against close-packing is thereby created via multitudes of mutual friction points of local joints (whether or not soldered together through eutectic bonding) among neighboring fibers. The density of kinks per unit length of fiber is used to control the "loft" of the bundles. For 50 $\mu$m diameter fibers, kinks have been used from a continuous spacing, i.e. making the fibers to be "waved" with different amplitudes and wave lengths, to sharp kinks spanning a few millimeters length each spaced nearly 2.5 cm apart, and the amplitude can be varied from fractions of a millimeter to a few millimeters. For practical reasons in one embodiment of this technique, the inventors have used V-kinks and have controlled the depth of the kinks via spooling the fibers under pre-selected tension. Hereby low tension provides deeper kinks while higher tension provides more shallow ones. However, it is also the case that a wide range of other kink shapes as well as continuous kinking, e.g. in a saw-tooth pattern, an undulating pattern, a waving or "lazy" spiraling of the fibers can be similarly used, and that depth of initial kink profile can be used instead of spooling tension. For mass-production, kinking, curling, spiraling etc., applied to strands, before or after twisting, if any, whether in continuous tows or finite lengths, instead of kinking spooled individual fibers, is also possible, and indeed will in a majority of cases be more cost effective.

Fiber Brush Stock Shaping

Fiber brushes of the present invention, other than obtained by spiraling, twisting or roping, have been made in the laboratory by compressing the fibers in a form to yield the intended brush stock shape and packing fraction, with or without annealing, whereby the chosen surface treatment can be either applied, or if already applied be "set", at the same time. The forms used in the laboratory include, for example, at least once piece providing a cavity of the intended shape of the brush stock and a matching lid by which compression can be applied to impart the desired packing fraction. The brush stock forms were made of stainless steel or graphite, but any other suitable material or combination of materials can be used including a variety of metals and ceramics, governed by the requirements (i) that they do not dissolve, or are dissolved in, the materials of the brush stock and (ii) that the form. maintain its shape independent of the annealing treatments used. Annealing treatments can be performed in the open atmosphere if the brush stock form material is resistant to oxidation and is firmly closed in use to inhibit oxidation of the fibers. They will require a protective atmosphere, e.g. of hydrogen, if the brush stock form and/or fiber stock materials are liable to oxidize at the heat treatment temperatures or if for some reason the form is not firmly closed, e.g. through leaks about the gaps between form components or the form is deliberately left open at one or both of its ends. In addition to the possible use of forms as indicated, extrusion, continuous rolling, continuous winding on mandrels, or reshaping is envisioned for large scale production of fiber brushes.

Cutting of Brushes From Brush Stock and Shaping Working Surfaces

A further important step in brush construction according to the present invention is cutting individual brushes from the "brush stock" and shaping their intended running surfaces. In some cases, especially for small dimensions and curved profiles, laser cutting may prove to be cost effective. Planar cuts through brush stock of a diameter which is comparable to or smaller than the average spacing between touching spots or joints can be made with a razor blade. For brush stock with a relatively large diameter, cutting poses a problem much like trying to cut a sponge without reducing the size of the pores in it. The problem is overcome by infiltrating the brush stock with a hardenable liquid (if need be at an elevated temperature), hardening it (e.g. cooling it to freezing or curing it in case of a resin, as the case may be), cutting the brush stock and/or shaping the running surface with the hardened liquid in it, re-melting or dissolving and removing the liquid (if need be by means of a centrifuge), and finally cleaning residues from the brush if necessary. Good results have been achieved using water, and cooling the water down to well below 0° C., either simply in the freezer compartment of a refrigerator or any lower temperature, e.g. of dry ice or liquid nitrogen, so as to reduce superficial melting at the cut surface during cutting or shaping. Other fluids that might be used include any aqueous liquids with surfactants aimed to increase wetting of the surface, low-viscosity oils, hard setting dissoluble gels, frozen carbon dioxide, i.e. dry ice, or commercial metallographic embedment resins.

The actual cutting of the brush stock filled with some temporarily hard substance can be done by any conventional means but optimally should be done with a sharp tool and speedily so as to avoid undue heating. After cutting and clearing the temporarily hard substance from the voids, the fibers at the cut face will typically be caked together. If so, they must be freed through gentle abrasion, preferentially with some kind of abrasive paper mounted on a substrate of the same shape as the intended rotor or substrate surface.

Alloy shape fixing and solder-bonding of fiber joints via eutectics has been employed in surface treatments while the fibers were encased in a fiber brush form for imparting the desired brush stock shape and packing fraction. For example, intended bush stock of silver fibers or silver-clad copper fibers was wrapped with a few turns of a 0.5 mm thick copper foil; copper fibers were wrapped with one or a few turns of silver leaf of about 0.5 $\mu$m thickness or the form was lined with the metal leaf prior to inserting the fibers. The thickness of the wrapping is chosen depending on the size of the brush stock and the depth of hardened layer desired. The forms were then heated to the required annealing temperature, typically in a protective atmosphere, meaning a cover gas which does not contain oxygen or any chemically aggressive gas.

It is further noted that metal fiber brushes can, and commonly should, conduct much higher current densities than conventional brushes, and they require much lighter mechanical pressure than conventional brushes. In fact, these are important advantages of metal fiber brushes, on account of which it is expected that in due course they will displace conventional "monolithic", graphite-based electrical brushes. However, for proper operation the brush force has to remain constant within reasonably close, predetermined limits, independent of length of brush wear. This creates a problem because, 1) the constant-force springs widely used for conventional brushes are generally too stiff and inaccurate for applying constant light loads, and 2) conventional current leads capable of conducting the required high currents to and from the brushes, are stiff and interfere with the intended light mechanical loading.

Furthermore, for practical mass applications, fiber brushes will eventually have to be sold/distributed in a packaged form which protects them from damage during storage, shipping and handling, and which is designed for fool-proof installation by unskilled workers, much like light bulbs or printer cartridges.

Figure 7A:
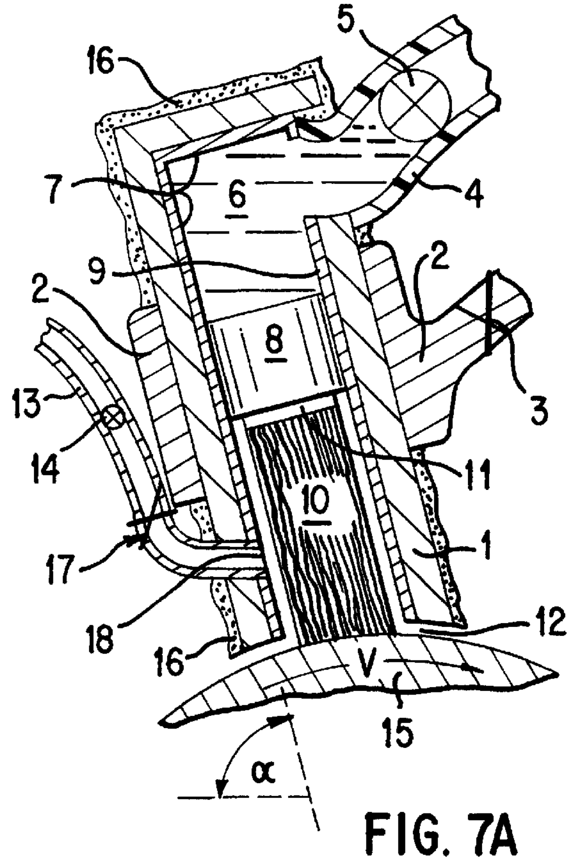
FIG. 7*a* is a schematic cross-sectional view illustrating a novel mechanical loading applied to the metal fiber brush of the present invention.

In a preferred embodiment, the present invention further includes a novel electrical brush holder and loading device useful for all types of brushes and particularly designed to maintain constant brush force while the brush wears. In "inexpensive" applications one makes do with spiral spring loading wherein the brush force slowly drops with wear. For more demanding applications one uses "constant force springs". These are generally reliable but far from ideal. In preferred embodiments, the mechanical loading of the brushes is done hydrostatically by means of a liquid metal which at the same time is used to conduct the current to and from the brushes. In the particular design of FIG. 7*a* each brush (10) is firmly, metallically fastened (e.g. via a screw connection) to a metal piston (8) in a cylinder (1) which is at least as long as the brush. On the side of the piston away from the brush, the cylinder is filled with the pressurized liquid metal (6). Such a combination of a piston whose end is designed for the attachment, e.g., by an electrically conducting brush attachment(11) which can be released, of a brush and the cylinder in which it glides constitutes a "brush holder". It may be advantageous to use a piston liner (9) and/or a cylinder liner (7) for insulation or low friction. Alternatively, the piston and cylinder may be replaced by bellows, not necessarily made of metal except for the provision of a conductive plate between liquid metal and the brush.

If the over-pressure in the liquid metal is $D_P$, the force exerted on the brush will be $P_b$=A $D_p$, minus the typically negligible friction between piston and cylinder. Here A is the cross-sectional area of the cylinder or bellows of whatever shape, albeit presumably in most cases of circular cross-section. When the liquid metal over-pressure is kept at a constant value, the same brush force will be maintained while the piston advances in the cylinder as the brush wears, independent of wear length, or will drop only slowly in case bellows are used.

The open end of the cylinder may be shaped to conform, with a predetermined clearance (12), to the running surface on which the brush slides, e.g. slip ring, commutator or rail (15). Similarly, a guide may be used in conjunction with bellows. Depending on conditions, e.g. in connection with fast-moving vehicles, it may be advantageous to make that clearance small so as to shield the brush from wind forces. Similarly, in motors or generators, it may be possible to shield the brushes from magnetic forces via a ferromagnetic cylinder or coverage (16).

Preferably, the holder cylinder or bellows are provided with a stop to limit the advance of the piston or bellows and thereby set a minimum brush length so that the contact surface (e.g., a rotor) is protected from scratching or gouging by the piston or the end of the bellows in the event that the brush inadvertently wears out before being replaced.

In a machine or other device which requires more than one, and perhaps hundreds of brushes, any selected group of brush holders may be connected to the same liquid metal reservoir. In fact, since the brush force is proportional to the cylinder or bellows cross sectional area, and this should ordinarily be close to, though larger than, that of the brushes, sets of brushes of the same general construction, and thus same elastic/plastic transition pressure, but with arbitrary shapes and sizes could be connected to the same reservoir.

Suitable bellows or hydrostatic cylinders and pistons are either directly available commercially or can almost certainly be procured from manufacturers since bellows and hydrostatic pressure cylinders in a great variety of shapes and sizes are manufactured in large numbers and by several firms both domestically and elsewhere. For storage, sale and handling, the fiber brushes may be packaged in light metal or plastic tubes. These should be suitably matched to the corresponding cylinder or bellows ends. Various mechanical mechanisms can be employed to fasten the brushes to the pistons, e.g. by sliding into a dovetail while the piston end slightly protrudes from the piston, or by a screw and thread arrangement. And similar connections can be made to the ends of bellows. Depending on construction, one or two simple valves (5) to control access of the fluid to a cylinder or bellows during brush installation may be helpful. For brush installation it may be similarly necessary to permit the cylinder or bellows to slide or swivel away from the running surface. This can be readily accomplished by the use of flexible plastic tubing (4) for the liquid metal, for example. In any event, the current is to be conducted through the liquid metal. An optional flexible hose (13) for the supply of moisture, lubricant, protective atmosphere, coolant, etc., or for exhaust purposes may be useful. The flexible hose (13) can be attached to the cylinder by an inlet (18). An optional valve (14) to control the access of lubricant, coolant, etc., may also be helpful. Further, a release or joint (3) may be used for easier brush installation. Likewise, a release or joint (17) for release of the hose (13) may be used for easier brush installation. In order to keep the cylinder in a fixed position relative to the slip ring, commutator, rail, etc. (15), a releasable or jointed attachment (2) can be used.

The most likely choices for the liquid metal are mercury (Hg) and sodium-potassium potassium alloy (NaK). Each have their advantages and disadvantages. In view of environmental considerations, NaK is preferred, especially since much experience with this liquid alloy is already available. Metals melting modestly above room temperature may also be used, such as gallium, provided that there are means to heat them before or immediately at the onset of use.

Figure 7B:
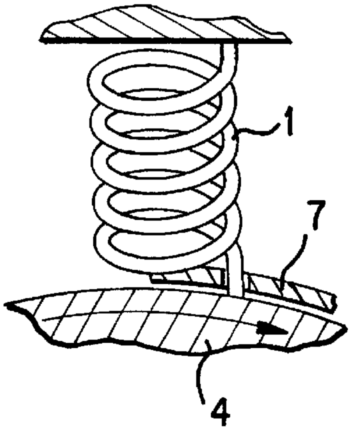
FIG. 7*b* and FIG. 7*c* show two different embodiments of loading devices using flexible brush stock of the present invention.
Figure 7C:
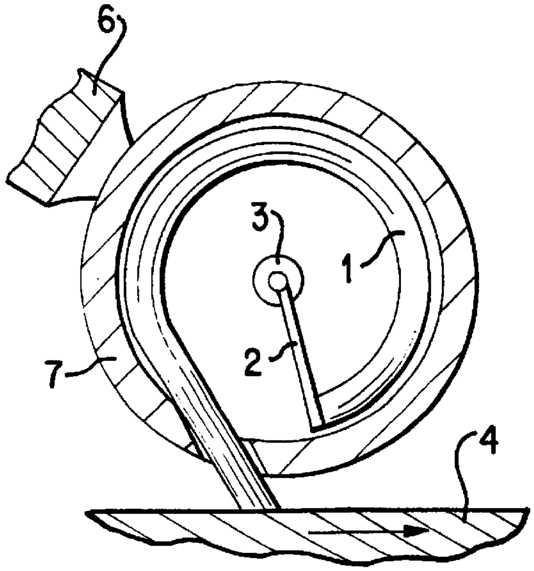
Figure 7D:
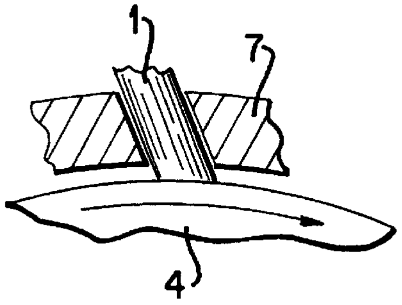
FIG. 7*d* shows a guide used to guide a free end of the brush stock in FIGS. 7*b* and 7*c;*

In addition, as depicted in FIG. 7*b*, there is a brush holder which makes use of an elastically bent brush stock (1) fed through a guide (7) towards a substrate (4) so as to let it's own elastic compression serve as a brush load. FIG. 7*c* depicts still yet another embodiment of the present invention in that a brush holder has a flexible brush stock (1), a shell (5) used to contain the brush stock, a rotatable conductive connection (2), and connection to power (3). In addition, a fastener (6) is used to secure the shell containing the brush stock. The brush stock is guided through an opening (7) in the shell (5) towards the substrate (4). FIG. 7*d* illustrates an example of a guide (7) that can be used in the brush holder of FIG. 7*c*. Alternatively, the rotatable brush connection (2) can be omitted and instead the inlet end of the brush stock be directly connected to the power (3), preferably after one or more complete turns of the brush stock (1) within the shell (5) and including a suitable elastic twist be imparted to the brush stock so as to force the working end of the brush stock through the guide (7) against the substrate surface (4).

Particularly advantageous in the present invention is that minor contaminations in the liquid metals which would make them unsuitable if used in direct contact with the rotor or slip ring surfaces, should be easily tolerable. Moreover, the total amount of liquid metal used can be kept relatively small, and the liquid metal flow rates will be low to imperceptible even in large systems in which many brushes might be operated simultaneously.

Obviously, numerous modifications and variations of the present invention are possible in light of the above teachings. It is therefore to be understood that within the scope of the appended claims, the invention may be practiced otherwise than as specifically described herein.

What is claimed is:

1. A brush stock for an electrical fiber brush, comprising:

plural conductive elements including at least one of plural conductive fibers and plural conductive strands of fibers; and said conductive elements having contacting engagements with each other at irregularly longitudinally spaced contact points with the contacting engagements maintaining elastic stresses between said conductive elements and maintaining irregularly longitudinally extended voids between said conductive elements.

2. A brush stock for an electrical fiber brush, comprising:

plural conductive elements including at least one of plural conductive fibers and plural conductive strands of fibers; and said conductive elements having contacting engagements interconnected by longitudinally extending fixed in shape segments of said conductive elements so as to maintain irregularly longitudinally extended voids between said conductive elements.

3. The brush stock according to claims 1 or 2, further comprising:

at least one of an outer surface layer, a casing, and a sheath covering at least a part of a surface of said brush stock.

4. The brush stock according to claim 3, wherein a mechanical strength per unit area of said at least one of said outer surface layer, said casing, and said sheath exceeds by at least 15% an average mechanical strength per unit area of the conductive elements and said voids adjacent to said at least one of said outer surface layer and said sheath.

5. The brush stock according to claim 3, wherein said at least one of said outer surface layer, said casing, and said sheath differs from the conductive elements adjacent to said at least one of said outer surface layer, said casing, and said sheath in chemical composition.

6. The brush stock according to claim 3, wherein a mechanical stiffness of an average conductive element in said at least one of said surface layer, said casing, and said sheath is at least 10% larger than that of corresponding conductive elements adjacent to said at least one of said outer surface layer, said casing, and said sheath.

7. The brush stock according to claims 1 or 2, comprising:
stitching provided between said conductive elements so as to fix a shape to said brush stock.

8. The brush stock according to claim 7, wherein said stitching comprises metal fibers.

9. The brush stock according to claims 1 or 2, further comprising:
said brush stock having an average packing fraction f, defined as the ratio of the total cross-sectional area of said conductive elements relative to the total cross-sectional area of the brush stock, within a range of 2% to 70%.

10. The brush stock according to claims 1 or 2, comprising:
said conductive elements having bends which define at least one of a regular or irregular spiral pattern, a regular or irregular wavy pattern, a regular or irregular saw-tooth pattern, a regular or irregular triangular pattern, a regular or irregular rectangular pattern, and a regular or irregular undulating pattern along a length of said conductive elements.

11. The brush stock according to claim 10, wherein said bends are spaced at intervals greater than five diameters of said conductive elements along the length of said conductive elements.

12. The brush stock according to claims 1 or 2, wherein said conductive elements have a diameter less than 0.2 mm.

13. The brush stock according to claims 1 or 2, wherein said conductive elements comprise a material selected from the group consisting of at least one metal, at least one form of carbon, at least one semiconductor, and at least one form of plastic.

14. The brush stock according to claim 3, wherein said at least one of said outer surface layer, said casing, and said sheath comprises an average packing fraction which is greater than an average packing fraction of the conductive elements adjacent to said at least one of said outer surface layer, said casing, and said sheath.

15. The brush stock according to claim 3, wherein said outer surface layer comprises an infiltrated material.

16. The brush stock according to claim 15, wherein said infiltrated material is selected from the group consisting of a metal, a lubricant, and an abrasive.

17. The brush stock according to claim 3, wherein said at least one of said outer surface layer, said casing, and said sheath comprises at least one of a foil and a metal leaf.

18. The brush stock according to claim 3, wherein said at least one of said outer surface layer, said casing, and said sheath comprises at least one member selected from the group consisting of a foil strip, a metal leaf strip, and a metal fiber wrapped around the brush stock at least once.

19. The brush stock according to claim 17, wherein said foil is at least partly made of a metal.

20. The brush stock according to claim 19, wherein said metal comprises at least one of cadmium, copper, indium, iron, nickel, niobium, tin, a noble metal, cadmium alloy, copper alloy, indium alloy, iron alloy, nickel alloy, niobium alloy, a noble metal alloy and tin alloy.

21. The brush stock according to claim 18, wherein said foil strip is at least partly made of a metal.

22. The brush stock according to claim 21, wherein said metal comprises at least one of cadmium, copper, indium, iron, nickel, niobium, tin, a noble metal, cadmium alloy, copper alloy, indium alloy, iron alloy, nickel alloy, niobium alloy, a noble metal alloy and tin alloy.

23. The brush stock according to claim 18, wherein said metal fiber comprises at least one of cadmium, copper, indium, iron, nickel, niobium, tin, a noble metal, cadmium alloy, copper alloy, indium alloy, iron alloy, nickel alloy, niobium alloy, a noble metal alloy and tin alloy.

24. The brush stock according to claim 3, wherein said at least one of said outer surface layer, said casing, and said sheath comprises at least two fibers alternatively wrapped around said brush stock at different orientations.

25. The brush stock according to claim 24, wherein said orientations comprise angles between ±20 degrees and ±90 degrees relative to a brush stock longitudinal axis.

26. The brush stock according to claim 3, wherein said at least one of said outer surface layer, said casing, and said sheath comprises at least two foil strips alternatively wrapped around said brush stock at different orientations.

27. The brush stock according to claim 26, wherein said orientations comprise angles between ±20 degrees and ±90 degrees relative to a brush stock longitudinal axis.

28. The brush stock according to claim 24, wherein said at least two fibers comprise fibers selected from the group consisting of cadmium, copper, indium, iron, nickel, niobium, tin, a noble metal, cadmium alloy, copper alloy, indium alloy, iron alloy, nickel alloy, niobium alloy, a noble metal alloy and tin alloy.

29. The brush stock according to claim 24, wherein said at least two fibers comprise fibers plated with a metal.

30. The brush stock according to claim 3, wherein said at least one of said outer surface layer, said casing, and said sheath comprises a predetermined size and shape so as to fix a shape to said brush stock.

31. The brush stock according to claims 1 or 2, wherein said contacting engagements of said conductive elements comprise bonded contacting engagements formed by at least one of the group consisting of soldering, welding, electroplating, electrophoresis, plasma spraying, thermally spraying, irradiation and heating said contacting engagements.

32. The brush stock according to claim 3, wherein said at least one of said outer surface layer, said casing, and said sheath comprises bonded contacting engagements within a peripheral layer of said brush stock formed by at least one of the group consisting of soldering, welding, electroplating, electrophoresis, plasma spraying, thermally spraying, irradiation and heating said contacting engagements.

33. The brush stock according to claims 1 or 2, further comprising:
a filler material between said conductive elements.

34. The brush stock according to claim 33, wherein said filler material comprises at least one of a strengthening material, an abrasive material, a lubricating material, and a polishing material.

35. The brush stock according to claim 34, wherein said filler material is selected from the group consisting of graphite, $MoS_2$, metal, semiconductor, plastic and any mixtures thereof.

36. The brush stock according to claim 34, wherein said lubricant comprises at least one of an oil and a solution of a colloidal graphite.

37. The brush stock according to claims 1 or 2, further comprising:

support fibers substantially more rigid than said conductive elements mixed within said conductive elements and mechanically strengthening said brush stock.

38. The brush stock according to claims 1 or 2, wherein said conductive elements comprise at least one of a cadmium fiber, a cadmium alloy fiber, a copper fiber, a copper alloy fiber, a silver fiber, a silver alloy fiber, a silver-plated copper fiber, a silver-plated copper alloy fiber, a cadmium-plated silver fiber, a gold-plated copper fiber, a gold-plated copper alloy fiber, a copper-plated silver fiber, a copper-plated silver alloy fiber, a gold fiber, a copper-plated gold fiber, a silver-plated gold fiber, a nickel-plated gold fiber, a copper-plated gold alloy fiber, a silver-plated gold-alloy fiber, a nickel-plated gold alloy fiber, a nickel-plated copper fiber, a nickel-plated copper alloy fiber, rhodium plated gold fiber, a rhodium plated gold alloy fiber, a platinum plated copper fiber, a platinum-plated copper-alloy fiber, a zirconium-plated copper fiber, a chromium-plated copper fiber, and a gold-nickel-plated copper fiber.

39. A brush stock for an electrical fiber brush, comprising:

plural conductive elements including at least one of plural conductive fibers and plural conductive strands of fibers; and said conductive elements having bonded contacting engagements with each other, said bonded contacting engagements irregularly spaced longitudinally and maintaining longitudinally irregularly extended voids between said conductive elements.

40. A brush stock for an electrical fiber brush, comprising:

plural conductive elements including at least one of plural conductive fibers and plural conductive strands of fibers, wherein plural of the conductive elements have longitudinally spaced fixed in shape segments; and said conductive elements having irregularly longitudinally spaced bonded contacting engagements interconnected at said fixed in shape segments of said conductive elements to maintain longitudinally irregularly extended voids between said conductive elements.

41. In a method of making a brush stock for an electrical fiber brush, the improvement comprising:

obtaining plural conductive elements including at least one of plural conductive fibers and plural conductive strands of fibers; and arranging said plural conductive elements in contacting engagement with each other at irregularly longitudinally spaced contact points with the contacting engagement maintaining said conductive elements under elastic stresses to maintain irregularly longitudinally extended voids between said conductive elements.

42. In a method of making a brush stock for an electrical fiber brush, the improvement comprising:

obtaining plural conductive elements including at least one of plural conductive fibers and plural conductive strands of fibers, and plural of said conductive elements having longitudinally extending fixed in shape segments; and arranging the obtained plural conductive elements with the fixed in shape segments of different of said elements irregularly spaced with respect to one another in contacting engagement interconnected by said fixed in shape segments of said conductive elements to maintain irregularly longitudinally extended voids between said conductive elements.

43. The method of claims 41 or 42, further comprising:

covering at least a part of an outer surface of said brush stock with at least one of an outer surface layer, a casing, and a sheath to maintain said conductive elements under elastic stress.

44. The method of claims 41 or 42, further comprising:

covering at least a part of an outer surface of said brush stock with at least one of an outer surface layer, a casing, and a sheath to provide a protective covering to said conductive elements.

45. The method of claims 41 or 42, further comprising:

compressing said arranged conductive elements in a form of a predetermined size and shape so as to fix a shape to brush stock.

46. The method of claim 44, further comprising:

simultaneously heating said conductive elements while compressing said conductive elements.

47. The method of claim 44 or 45, further comprising:

stitching said conductive elements together so as to fix a shape to the brush stock.

48. The method of claims 41 or 42, comprising:

providing conductive elements having bends formed by crimping, kinking, waving, spiraling, pleating, folding, and curling said conductive elements.

49. The method of claims 41 or 42, wherein said arranging step comprises:

placing a layer of said conductive elements on a thin metal foil; and rolling up the thin metal foil with said layer of said conductive elements placed thereon.

50. The method of claims 41 or 42, wherein said arranging step comprises:

rolling up said conductive elements.

51. The method of claims 41 or 42, wherein said arranging step comprises at least one of the steps of twisting, felting, roping, matting, spiraling, braiding, interweaving and interlinking said conductive elements.

52. The method of claims 41 or 42, further comprising:

partially filling spaces between said conductive elements with at least one of a strengthening material, a lubricating material, a polishing material, and an abrasive material.

53. The method of claim 43, further comprising:

heating said brush stock to a melting-point temperature of at least one component of said at least one of said outer surface layer and said sheath.

54. The method of claims 41 or 42, further comprising:

inserting said brush stock into a casing of a predetermined size and shape so as to fix a shape to the brush stock.

55. The method of claim 43, further comprising:

heating said brush stock to a melting-point temperature of an alloy formed of at least two chemical constituents of said at least one of said outer surface layer, said casing, and said sheath.

56. The method of claims 41 or 42, further comprising:

dipping or rolling said brush stock into a powder-mixture comprising a constituent of a metallic eutectic;

heating said brush stock to a melting-point temperature of said metallic eutectic; and cooling said brush stock.

57. The method of claims 41 or 42, further comprising:

spraying at least a portion of an exterior of said brush stock with a strengthening material.

58. The method of claims 41 or 42, further comprising:

heating said brush stock to induce local melting or eutectic formation at interconnections of said conductive elements.

59. The method of claims 41 or 42, further comprising:

irradiating said brush stock to induce local melting or eutectic formation at interconnections of said conductive elements.

60. The method of claims 41 or 42, further comprising:

eutectically bonding said contacting engagements of said conductive elements.

61. The method of claims 41 or 42, further comprising:

cutting a brush from said brush stock.

62. The method of claims 41 or 42, further comprising:

shaping an end of said brush stock.

63. The method of claim 62, further comprising:

sliding said end of said brush stock against an abrading material shaped to conform to a shape of a rotor or other substrate surface.

64. The method of claim 61, wherein said cutting step comprises:

infiltrating at least a portion of one end of said brush stock with a hardenable or freezable liquid;

hardening or freezing said liquid;

cutting said brush stock; and dissolving or melting and removing said liquid from said brush stock.

65. The method of claims 41 or 42, wherein said arranging step comprises:

mixing support fibers in between said conductive elements.

66. The method of claims 41 or 42, further comprising:

introducing a component into the brush stock; and heating said brush stock to diffuse said component into said conductive elements.

67. The method of claim 66, wherein said component comprises at least one of a foil and a powder.

68. In a method of making a brush stock for an electrical fiber brush, the improvement comprising:

obtaining plural conductive elements including at least one of plural conductive fibers and plural conductive strands of fibers;

arranging said plural conductive elements in contacting engagement with each other; and bonding the contacting engagements such that the bonded contacting engagements are irregularly spaced longitudinally and maintain longitudinally irregularly extended voids between the conductive elements.

69. In a method of making a brush stock for an electrical fiber brush, the improvement comprising:

obtaining plural conductive elements including at least one of plural conductive fibers and plural conductive strands of fibers, wherein plural of the conductive elements have longitudinally spaced fixed in shape segments;

arranging said plural conductive elements in contacting engagement interconnected at said fixed in shape segments of said conductive elements; and bonding the contacting engagements such that the bonded contacting engagements are irregularly spaced longitudinally and maintain longitudinally irregularly extended voids between the conductive elements.

* * * * *

UNITED STATES PATENT AND TRADEMARK OFFICE

CERTIFICATE OF CORRECTION

PATENT NO. : 6,245,440 B1
DATED : June 12, 2001
INVENTOR(S) : Kuhlmann-Wilsdorf et al.

It is certified that error appears in the above-identified patent and that said Letters Patent is hereby corrected as shown below:

Title page,
The Related U.S. Application Data should read :
-- [60] Provisional application No. 60/014,753, April 5, 1996 --

Signed and Sealed this

Seventh Day of May, 2002

Attest:

JAMES E. ROGAN
*Director of the United States Patent and Trademark Office*

*Attesting Officer*

UNITED STATES PATENT AND TRADEMARK OFFICE

CERTIFICATE OF CORRECTION

PATENT NO. : 6,245,440 B1 
APPLICATION NO. : 09/147100
DATED : June 12, 2001
INVENTOR(S) : Doris Kuhlmann-Wilsdorf et al.

It is certified that error appears in the above-identified patent and that said Letters Patent is hereby corrected as shown below:

Col. 1, line 3
Please replace the first paragraph with:

U.S. GOVERNMENT RIGHTS

This invention was made with United States Government support under Contract No. N00014-98-C-2904 awarded by the Naval Research Laboratory. The United States Government has certain rights in the invention.

Signed and Sealed this

Twenty-fourth Day of October, 2006

JON W. DUDAS
*Director of the United States Patent and Trademark Office*